(12) United States Patent
Shinohara

(10) Patent No.: US 9,517,635 B2
(45) Date of Patent: Dec. 13, 2016

(54) IMAGE FORMING METHOD

(71) Applicant: FUJIFILM CORPORATION, Tokyo (JP)

(72) Inventor: Ryuji Shinohara, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/635,468

(22) Filed: Mar. 2, 2015

(65) Prior Publication Data
US 2015/0166819 A1 Jun. 18, 2015

Related U.S. Application Data

(63) Continuation of application No. PCT/JP2013/075528, filed on Sep. 20, 2013.

(30) Foreign Application Priority Data

Sep. 27, 2012 (JP) .................. 2012-214523

(51) Int. Cl.
| | | |
|---|---|---|
| *B41J 2/01* | (2006.01) | |
| *B41J 2/21* | (2006.01) | |
| *C09D 11/322* | (2014.01) | |
| *C09D 11/38* | (2014.01) | |
| *C09D 11/40* | (2014.01) | |
| *C09D 11/36* | (2014.01) | |
| *C09D 11/54* | (2014.01) | |
| *C09D 139/06* | (2006.01) | |

(52) U.S. Cl.
CPC .......... *B41J 2/2114* (2013.01); *B41J 2/01* (2013.01); *B41J 2/2107* (2013.01); *C09D 11/322* (2013.01); *C09D 11/36* (2013.01); *C09D 11/38* (2013.01); *C09D 11/40* (2013.01); *C09D 11/54* (2013.01); *C09D 139/06* (2013.01)

(58) Field of Classification Search
USPC .................................. 347/95–105
See application file for complete search history.

(56) References Cited

U.S. PATENT DOCUMENTS 8,608,844 B2    12/2013  Arai et al.
2009/0088521 A1*  4/2009  Hosokawa .......... C09D 11/326
                                                    524/558
2011/0043578 A1*  2/2011  Tojo .................. B41M 5/0023
                                                    347/102
2012/0320121 A1* 12/2012  Arai ................... B41J 2/2107
                                                    347/20
2012/0320123 A1* 12/2012  Takeda ............... B41J 2/2107
                                                    347/21

FOREIGN PATENT DOCUMENTS

JP    2009-191135 A    8/2009
JP    2010-023339 A    2/2010

OTHER PUBLICATIONS

International Search Report; PCT/JP2013/075528; Nov. 26, 2013.
Written Opinion of the International Searching Authority; PCT/JP2013/075528; Nov. 26, 2013.
The extended European search report issued by the European Patent Office on May 2, 2016, which corresponds to European Patent Application No. 13842228.2-1302 and is related to U.S. Appl. No. 14/635,468.

* cited by examiner

*Primary Examiner* — Manish S Shah
(74) *Attorney, Agent, or Firm* — Studebaker & Brackett PC

(57) ABSTRACT

An image forming method comprises: applying a treatment liquid, which contains an organic acidic compound represented by the following general formula (I), a water-soluble polymer compound, and water, on a recording medium; and applying an ink composition, which contains a pigment, a pyrrolidone derivative, a compound represented by the following general formula (II), and water, on a treatment liquid-applied surface of the recording medium. In the general formula (I), n represents an integer of 2 or greater and m represents an integer of 3 or greater. In the general formula (II), l, m, and n represent an integer of 1 or greater, the relation l+m+n=3 to 15 is satisfied, and AO represents ethyleneoxy or propyleneoxy.

General Formula (I)
$$C_nH_{2n+2-m}(COOH)_m$$

General Formula (II)
$$H_2C-(AO)_l OH$$
$$HC-(AO)_m OH$$
$$H_2C-(AO)_n OH$$

11 Claims, 2 Drawing Sheets

IMAGE FORMING METHOD

CROSS-REFERENCE TO RELATED APPLICATIONS

This application is a Continuation of PCT International Application No. PCT/JP2013/75528, filed on Sep. 20, 2013, which claims priority under 35 U.S.C. §119(a) to Japanese Patent Application No. 2012-214523, filed on Sep. 27, 2012. Each of the above application(s) is hereby expressly incorporated by reference, in its entirety, into the present application.

BACKGROUND OF THE INVENTION

1. Field of the Invention

The present invention relates to an image forming method.

2. Description of the Related Art

In recent years, as a result of the progress in inkjet recording technologies, there have been suggested image forming technologies utilizing an inkjet method as a method of forming high definition images for photograph applications or offset printing applications. In the inkjet method, it is required that high quality images can be formed at a high speed.

More recently, the demand for image forming at a high speed is further increasing. For example, in a system of drawing an image at a high speed using rolled paper, scratch resistance after drawing is important. That is, if the scratch resistance of an image is low, after an image is drawn, the rolled paper on which an image was drawn is piled up for a short period of time, and when paper sheets are brought into contact and rubbed with each other, blurring or the like may occur in the image, so that the product value may be lost in some cases.

Specifically, if the scratch resistance of a drawn image is poor, a trouble occurs such that when a character image is drawn, the character may become faint, and when dropout characters are drawn, the characters cannot be read. Furthermore, when an image of a bar code or a QR code (registered trademark) is drawn, a trouble that the code may not be normally read may occur. Such a phenomenon is significantly likely to occur, particularly in paper in which an ink can be easily retained on the paper surface, for example, paper exclusively for inkjet printing that does not have a porous ink-receiving layer.

Meanwhile, there is a technology of improving ink penetrability into paper as an ink technology. In this case, an ink easily penetrates into paper. Therefore, the scratch resistance of the image itself is improved. However, optical density (OD) deteriorates and a phenomenon (strike through) in which an ink passes through paper and seeps through a rear surface of the paper is significantly shown. For this reason, as a result, there is a problem in that it is impossible to draw images on both surfaces by simply improving ink penetrability. In addition, there is also a problem in that, when drawing an image using multiple colors such as red, green, and blue, color inks spread on paper and are mixed together, and therefore, a color gamut of the secondary color is degraded. Such a phenomenon is likely to occur significantly, particularly in paper in which an ink easily penetrates, for example, plain paper.

Attention is paid to water-based inks as an ink used in inkjet methods in view of considering the environment. For example, from the viewpoints of ejection stability of the ink, and print quality such as less bleeding on plain paper, aqueous inks containing ethylene oxide adducts or propylene oxide adducts of glycerin have been disclosed (see, for example, JP2009-191135A).

In addition, as an ink set which can suppress occurrence of ink bleeding and color mixing in an image while suppressing occurrence of curling and wrinkles called cockling in recording, an ink set which contains an ink composition containing a colorant, resin particles, a water-soluble organic solvent, and water; and an aggregating agent for aggregating components in the ink composition; and a treatment liquid containing a water-soluble polymer which does not cause aggregation of the components in the ink composition is known (see, for example, JP2010-023339A).

SUMMARY OF THE INVENTION

An object of the present invention is to provide an image forming method which forms an image having high resolution while having excellent scratch resistance (in some cases, also called abrasion resistance), and to achieve such an object.

The image forming method for solving the problem to be solved by the present embodiment is as follows.

<1> An image forming method including:
applying a treatment liquid, which contains an organic acidic compound represented by the following general formula (I), a water-soluble polymer compound, and water, on a recording medium; and applying an ink composition, which contains a pigment, a pyrrolidone derivative, a compound represented by the following general formula (II), and water, on a treatment liquid-applied surface of the recording medium.

[Chem. 1]

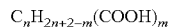

General Formula (I)

In the general formula (I), n represents an integer of 2 or greater and m represents an integer of 3 or greater.

[Chem. 2]

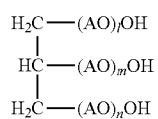

General Formula (II)

In the general formula (II), l, m, and n each independently represent an integer of 1 or greater, the relation l+m+n=3 to 15 is satisfied, and AO represents at least one of ethyleneoxy and propyleneoxy.

<2> The image forming method according to <1>, in which the treatment liquid further contains silicone oil.

<3> The image forming method according to <1> or <2>, in which in applying the ink composition, the recording medium is conveyed at a conveyance speed of 50 m/min or higher.

<4> The image forming method according to any one of <1> to <3>, in which the pyrrolidone derivative is at least one of 2-pyrrolidone and N-methyl-2-pyrrolidone.

<5> The image forming method according to any one of <1> to <4>, in which the content of the pyrrolidone derivative in the ink composition is 3.0 mass % to 20.0 mass % relative to the total mass of the ink composition.

<6> The image forming method according to any one of <1> to <5>, in which the content of the organic acidic compound in the treatment liquid is 0.5 mass % to 20.0 mass % relative to the total mass of the treatment liquid.

<7> The image forming method according to any one of <1> to <6>, in which AO in the general formula (II) is propyleneoxy.

<8> The image forming method according to any one of <1> to <7>, in which the water-soluble polymer compound contains a structural unit represented by the following general formula (A) and a structural unit represented by the following general formula (B).

[Chem. 3]

General Formula (A)

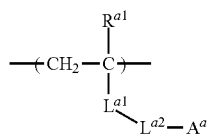

In the general formula (A), $R^{a1}$ represents a hydrogen atom or a methyl group.

In the general formula (A), $L^{a1}$ represents a single bond, —COO—, or —CON($R^{a3}$)—, and $R^{a3}$ represents a hydrogen atom or a monovalent group, which has 1 to 30 carbon atoms and may include at least one of an ether bond, a thioether bond, and an ester bond.

In the general formula (A), $L^{a2}$ represents a single bond or a divalent linking group, which has 1 to 30 carbon atoms and may include at least one of an ether bond, a thioether bond, and an ester bond.

In the general formula (A), $A^a$ represents an ionic group.

[Chem. 4]

General Formula (B)

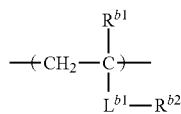

In the general formula (B), $R^{b1}$ represents a hydrogen atom or a methyl group.

In the general formula (B), $L^{b1}$ represents a single bond, —COO—, or —CON($R^{b3}$)—, and $R^{b3}$ represents a hydrogen atom or a monovalent group, which has 1 to 30 carbon atoms and may include at least one of an ether bond, a thioether bond, and an ester bond.

In the general formula (B), $R^{b2}$ represents a hydrogen atom or a monovalent group, which has 1 to 30 carbon atoms and may include at least one of an ether bond, a thioether bond, and an ester bond.

However, when $R^{b2}$ is a hydrogen atom, $L^{b1}$ is a single bond.

<9> The image forming method according to <8>, in which $R^{b2}$ is a linear aliphatic hydrocarbon group having 1 to 12 carbon atoms, an aliphatic hydrocarbon group which has a branched structure and has 3 to 12 carbon atoms, an aliphatic hydrocarbon group which has a ring structure and has 3 to 12 carbon atoms, an aralkyl group having 7 to 12 carbon atoms, or an aryloxyalkyl group having 7 to 12 carbon atoms.

<10> The image forming method according to <8> or <9>, in which $R^{a1}$ is a hydrogen atom, $L^{a1}$ is —COO— or —CONH—, $L^{a2}$ is an alkylene group having 1 to 12 carbon atoms, and $A^a$ is a sulfonic acid group or a salt thereof, and in which $R^{b1}$ is a hydrogen atom or a methyl group, $L^{b1}$ is —COO—, $R^{b2}$ is a linear aliphatic hydrocarbon group having 1 to 12 carbon atoms, an aliphatic hydrocarbon group which has a branched structure and has 3 to 12 carbon atoms, an aliphatic hydrocarbon group which has a ring structure and has 3 to 12 carbon atoms, an aralkyl group having 7 to 12 carbon atoms, or an aryloxyalkyl group having 7 to 12 carbon atoms.

According to the present invention, an image forming method that forms an image which has excellent abrasion resistance and high resolution is provided.

BRIEF DESCRIPTION OF THE DRAWINGS

FIGS. 1A and 1B are an example of an image of Japanese Kanji which is drawn through an image forming method in accordance with an embodiment of the present invention.

DESCRIPTION OF THE PREFERRED EMBODIMENTS

Figures 2A, 2B:
FIGS. 2A and 2B are another example of an image of Japanese Kanji which is drawn through the image forming method in accordance with an embodiment of the present invention.

Hereinafter, an image forming method of the present invention will be described.

<<Image Forming Method>>

The image forming method of the present invention includes a treatment liquid applying step of applying a treatment liquid, which contains an organic acidic compound represented by the following general formula (I), a water-soluble polymer compound, and water, on a recording medium; and an ink applying step of applying an ink composition, which contains a pigment, a pyrrolidone derivative, a compound represented by the following general formula (II), and water, on a treatment liquid-applied surface of the recording medium.

The image forming method of the present invention may be further provided with other steps such as heating and fixing a formed image as necessary.

Hereinafter, the ink composition is also simply referred to as an ink. The organic acidic compound represented by the general formula (I) is also referred to as a specific organic acidic compound and the compound represented by the general formula (II) is also referred to as a specific glycerin-based compound.

According to the image forming method in the related art, a problem called strike through, in which ink composition is soaked in a recording medium and passes through a back side of the recording medium, is suppressed. However, in the method in the related art, the ink composition remains on the inside of the recording medium which is close to an ink-applied surface of the recording medium without passing through the recording medium. Therefore, it is impossible to sufficiently suppress bleeding of the ink composition.

In the recording medium, there is a tendency that when an image is drawn through point depiction using an ink composition, if any bleeding of the ink composition occurs, the image becomes faint and the resolution of the image deteriorates.

In contrast, in the present invention, an ink composition is not easily soaked on the inside of a recording medium by applying a treatment liquid, which contains a specific organic acidic compound, a water-soluble polymer compound, and water, to the recording medium before applying the ink composition to the recording medium, and therefore, it is possible to make the ink remain on the surface of the recording medium. For this reason, it is possible to prevent bleeding of the ink composition and to improve the resolution of the image. In addition, the image density is likely to increase to the extent that the ink composition is not soaked in the recording medium.

In contrast, if the ink composition remains on the surface of the recording medium without being soaked in the recording medium, a dried matter (that is, image) of the ink composition remains on the surface of the recording medium, and therefore, the image easily receives an external load.

However, it is possible to maintain image intensity with which it is difficult to cause image defects such as a scratch, using an ink composition constituted by pyrrolidone derivative and a specific glycerin-based compound. Accordingly, the formed image is also excellent in scratch resistance.

As described above, according to the image forming method of the present invention, an image which has excellent abrasion resistance and high resolution is formed.

Hereinafter, a treatment liquid applying step, an ink applying step, and other steps, which can be included as necessary, configuring the image forming method of the present invention will be described in detail.

<Treatment Liquid Applying Step>

In the treatment liquid applying step, a treatment liquid, which contains an organic acidic compound represented by general formula (I), a water-soluble polymer compound, and water is applied on a recording medium.

That is, in the image forming method of the present invention, a treatment liquid for aggregating components (pigment or the like) in an ink composition is applied on a recording medium in advance before applying the ink composition thereto, and then, the ink composition is applied thereto so as to be in contact with the treatment liquid which was applied on the recording medium to form an image.

Accordingly, it is possible to increase the speed of image formation (for example, to form an image while conveying the recording medium at a conveyance speed of 50 m/min or higher), and it is possible to obtain an image having high image density and resolution.

The applying of the treatment liquid to the recording medium can be performed through various methods such as a method of immersing a recording medium in the treatment liquid; a well-known coating method using a bar coater, an extrusion die coater, an air doctor coater, bread coater, a rod coater, a knife coater, a squeeze coater, and a reverse roll coater; and an applying method using an inkjet method.

In addition, in the present invention, it is preferable to heat and dry a treatment liquid on a recording medium after the treatment liquid is applied on the recording medium until the ink composition is applied. Accordingly, ink colorability is improved, for example, bleeding is prevented, and therefore, it is possible to record a visible image which has favorable color density and a favorable hue.

The heating and drying is performed using well-known heating means such as a heater; air blowing means, such as a dryer, using air blowing; or combined means thereof.

Examples of the heating method include a method of applying heat from a side opposite to a treatment liquid-applied surface on a recording medium using a heater or the like; a method of blowing warm air or hot air against a treatment liquid-applied surface of a recording medium; and a heating method using an infrared heater; and a plurality of these methods may be used in combination for heating.

[Recording Medium]

In the image forming method of the present invention, an image is formed on a recording medium as described above.

The recording medium is not particularly limited, but a general printing paper, which is used for general offset printing or the like and is mainly formed of cellulose, can be used.

In addition, so-called coated paper may also be used as the recording medium.

The coated paper is a recording medium provided with a coating layer (also called a coated layer) containing an inorganic pigment or the like on a surface of high quality paper, neutral paper, or the like which is mainly formed of cellulose as a support and of which the surface is not usually treated. The coated paper tends to easily cause uneven glossiness of an image area. However, it is possible to effectively suppress the generation of the uneven glossiness of the image area if the treatment liquid contains phosphoric acid or a phosphoric acid compound. Specifically, it is preferable to use art paper, coated paper, lightweight coated paper, or fine coated paper.

An inorganic pigment contained in the coated layer is not particularly limited, but it is preferable to use at least one selected from silica, kaolin, clay, calcined clay, zinc oxide, tin oxide, magnesium sulfate, aluminum oxide, aluminum hydroxide, pseudo-boehmite, calcium carbonate, satin white, aluminum silicate, smectite, zeolite, magnesium silicate, magnesium carbonate, magnesium oxide, and diatomaceous earth from the viewpoint that the effect of suppressing uneven glossiness due to the treatment liquid containing phosphoric acid or a phosphoric acid compound is significantly exhibited, and it is more preferable to use calcium carbonate, silica, and kaolin. Particularly, when the coated layer contains magnesium carbonate, the effect of suppressing uneven glossiness due to phosphoric acid or a phosphoric acid compound is particularly significantly exhibited.

In general, it is possible to use a commercially available product as the recording medium, and examples thereof include: high quality paper (A) such as "OK Prince Quality" manufactured by Oji Paper Co., Ltd., "Shiraoi" manufactured by Nippon Paper Industries Co., Ltd., and "New NPI High-Quality" manufactured by Nippon Paper Industries Co., Ltd.; fine coated paper such as "OK Everlight Coat" manufactured by Oji Paper Co., Ltd. and "Aurora S" manufactured by Nippon Paper Industries Co., Ltd.; lightweight coated paper (A3) such as "OK Coat L" manufactured by Oji Paper Co., Ltd. and "Aurora L" manufactured by Nippon Paper Industries Co., Ltd.; coated paper (A2, B2) such as "OK Topcoat Plus" manufactured by Oji Paper Co., Ltd. and "Aurora Coat" manufactured by Nippon Paper Industries Co., Ltd.; and art paper (A1) such as "OK Kinfuji Plus" manufactured by Oji Paper Co., Ltd. and "Tokubishi Art" manufactured by Nippon Paper Industries Co., Ltd. In addition, various types of paper intended for photograph for inkjet recording can also be used.

From the viewpoint of obtaining a high-grade image which has great effect of suppressing movement of color materials and has a more favorable color density and a more favorable hue than before, the recording medium preferably has 0.05 mL/m$^2$·ms$^{1/2}$ to 0.5 mL/m$^2$·ms$^{1/2}$ of absorption coefficient Ka with respect to water, more preferably 0.1 mL/m$^2$·ms$^{1/2}$ to 0.4 mL/m$^2$·ms$^{1/2}$ thereof, and even more preferably 0.2 mL/m$^2$·ms$^{1/2}$ to 0.3 mL/m$^2$·ms$^{1/2}$ thereof.

The absorption coefficient Ka with respect to water has the same meaning as that disclosed in Japan TAPPI paper pulp test method No. 51:2000 (published by Japan TAPPI).

Specifically, the absorption coefficient Ka is calculated from the difference in transition amount of water between the contact time 100 ms and the contact time 900 ms using an automatic scanning liquid absorption meter KM 500 Win (manufactured by Kumagai Riki Kogyo Co., Ltd.).

[Treatment Liquid]

The treatment liquid contains a specific organic acidic compound, a water-soluble polymer compound, and water. The treatment liquid may contain other components such as silicone oil as necessary.

The treatment liquid is a liquid for aggregating components (pigment or the like) in an ink composition by the specific organic acidic compound. With use of the treatment liquid which is added to the ink composition containing a pigment, it is possible to increase the speed of inkjet recording and obtain an image which has high density and resolution and is excellent in a drawing property (for example, reproducibility of fine lines or minute portions), even during high speed recording.

(Organic Acidic Compound Represented by General Formula (I))

The treatment liquid contains at least one organic acidic compound represented by the general formula (I) (specific organic acidic compound).

The organic acidic compound represented by the following general formula (I) has a high ability of aggregating an ink composition (pigment or the like), and therefore, the movement of ink droplets applied on a recording medium can be effectively suppressed. As a result, roughness of an image caused by the movement of the ink droplets is effectively suppressed.

[Chem. 5]

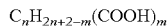

$$C_nH_{2n+2-m}(COOH)_m \qquad \text{General Formula (I)}$$

In the general formula (I), n represents an integer of 2 or greater and m represents an integer of 3 or greater.

In the general formula (I), it is preferable that n be an integer from 3 to 5. When n is 3 or greater, the roughness of an image is further suppressed. When n is 5 or less, the scratch resistance of an image (physical strength of an image: the same applies hereinafter) is further improved.

In addition, in the general formula (I), it is preferable that m be an integer from 3 to 5. When m is 3 or greater, the movement of ink droplets is further suppressed. When m is 5 or less, the scratch resistance of an image is improved.

Specific examples of the specific organic acidic compound include 1,2,3-propanetricarboxylic acid, 1,3,5-pentanetricarboxylic acid, and 1,2,3,4-butanetetracarboxylic acid.

The content of a specific organic acidic compound in a treatment liquid is not particularly limited, but is preferably 0.5 mass % to 20 mass %, more preferably 0.5 mass % to 15 mass %, and even more preferably 0.5 mass % to 10 mass %, relative to the total mass of the treatment liquid. When the content of the organic acidic compound represented by the general formula (I) in the treatment liquid is 0.5 mass % or greater, it is possible to further suppress the roughness of an image, and when the content thereof is 20 mass % or less, the scratch resistance of an image is further improved.

The treatment liquid may further contain other organic acidic compounds in addition to the specific organic acidic compound, and examples thereof include monovalent saturated fatty acid in which m is represented by 1 in the general formula (I), divalent saturated fatty acid in which m is represented by 2 in the general formula (I), and monovalent or polyvalent unsaturated fatty acid.

When the treatment liquid contains other organic acidic compounds in addition to the specific organic acidic compound, it is preferable that the other organic acidic compounds be compounds containing two carboxy groups in one molecule.

Examples of the compound containing two carboxy groups in one molecule include tartaric acid, phthalic acid, 4-methylphthalic acid, DL-malic acid, malonic acid, glutaric acid, dimethyl malonic acid, and maleic acid. Among these, DL-malic acid, malonic acid, glutaric acid, dimethyl malonic acid, and maleic acid are preferable.

When the treatment liquid contains other organic acidic compounds in addition to the specific organic acidic compound, the total organic acidic compound (total amount of the specific organic acidic compound and the other organic acidic compounds) in the treatment liquid is preferably 5.0 mass % to 40.0 mass %. The content of the specific organic acidic compound is preferably 10 mass % to 50 mass % relative to the total mass of the total organic acidic compound. In a case in which an image is drawn on coated paper, when the content of the specific organic acidic compound in the total organic acidic compound is 5 mass % or greater, it is possible to further suppress the roughness of an image, and when the content thereof is 50 mass % or less, the scratch resistance of an image is further improved.

In addition, the content of the total organic acidic compound in the treatment liquid in the case in which the treatment liquid contains other organic acidic compounds in addition to the specific organic acidic compound is preferably 5.0 mass % to 40.0 mass % and more preferably 10.0 mass % to 30.0 mass %, relative to the total mass of the treatment liquid, from the viewpoint of the aggregatability of an ink and of suppressing the roughness of an image.

(Water-Soluble Polymer Compound)

The treatment liquid in the present invention contains at least one water-soluble polymer compound.

Accordingly, it is possible to suppress the aggregation rate to some extent when components in an ink composition are aggregated due to the organic acidic compound, and to increase the size of an ink droplet applied on a recording medium to a target size. Accordingly, it is possible to suppress the roughness of an image caused by an ink being insufficiently spread.

Here, the "water solubility" refers to a phenomenon in which a substance can be dissolved in water at a certain concentration or more, and any case may be included as long as the substance can be (desirably, uniformly) dissolved in an aqueous treatment liquid. Specifically, the solubility with respect to water at 25° C. is preferably 5 mass % or greater and more preferably 10 mass % or greater.

When the treatment liquid contains a water-soluble polymer compound, bubbles are easily generated in the treatment liquid and there is a tendency that application unevenness of the treatment liquid caused by the bubbles is easily generated.

In the present invention, it is possible to suppress the application unevenness of the treatment liquid caused by the bubbles in the treatment liquid while suppressing the roughness of an image by incorporating silicone oil into the treatment liquid which contains a water-soluble polymer compound.

The water-soluble polymer compound is not particularly limited, but it is possible to use well-known water-soluble polymer compounds such as polyvinyl alcohol, polyacrylamide, polyvinyl pyrrolidone, and polyethylene glycol.

In addition, a specific polymer compound to be described later is also suitable for the water-soluble polymer compound.

The weight average molecular weight of the water-soluble polymer compound is not particularly limited, but can be set to, for example, 10000 to 100000, preferably 20000 to 80000, and more preferably 30000 to 80000.

In addition, the content of the water-soluble polymer compound in the treatment liquid in the present invention is not particularly limited, but is preferably 0.1 mass % to 10 mass %, more preferably 0.1 mass % to 4 mass %, even more preferably 0.1 mass % to 2 mass %, and particularly preferably 0.1 mass % to 1 mass %, relative to the total amount of the treatment liquid.

When the content of the water-soluble polymer compound in the treatment liquid is 0.1 mass % or greater, it is possible to further promote the spreading of ink droplets, and when the content of the water-soluble polymer compound in the treatment liquid is 10 mass % or less, it is possible to further suppress thickening of the treatment liquid. In addition, when the content of the water-soluble polymer compound in the treatment liquid is 10 mass % or less, it is possible to further suppress the application unevenness of the treatment liquid caused by bubbles in the treatment liquid.

—Specific Polymer Compound—

A polymer compound (hereinafter, also referred to as a "specific polymer compound") which contains a hydrophilic structural unit having an ionic group (preferably, anionic group) is preferably used as the water-soluble polymer compound contained in the treatment liquid. Accordingly, it is possible to further promote the spreading of ink droplets applied on a recording medium and to further suppress the roughness of an image.

The reason why it is possible to obtain effects of further promoting the spreading of ink droplets applied on a recording medium and of further suppressing the roughness of an image is estimated as follows, using the specific polymer compound.

The specific polymer compound maintains affinity with a solvent (for example, water) in a treatment liquid by the action of an ionic group of a side chain moiety. Meanwhile, it is considered that the polymer compound in the treatment liquid applied on a recording medium exists in the vicinity (vicinity of a side away from the recording medium) of the surface of the treatment liquid mainly by the action between a main chain moiety, and a side chain moiety from which the ionic group is removed. When an ink composition is applied on the treatment liquid on the recording medium in this state, the treatment liquid is prevented from penetrating into the ink composition to some extent due to the specific polymer compound existing in the vicinity of the surface of the treatment liquid. As a result, it is considered that the aggregation rate of the ink composition due to the organic acidic compound is suppressed to some extent and the spreading of ink droplets is promoted.

Accordingly, the specific polymer compound is likely to exist in the vicinity of the surface of the treatment liquid, and therefore, exhibits excellent effect in suppressing the roughness of an image.

However, on the other hand, it was found that when the specific polymer compound is used as the water-soluble polymer compound, bubbles are easily generated in the treatment liquid, and therefore, application unevenness of the treatment liquid caused by the bubbles is more easily generated.

Accordingly, when the specific polymer compound is used as the water-soluble polymer compound, the effect of suppressing the application unevenness of the treatment liquid using the above-described silicone oil is more significantly exhibited.

Examples of the ionic group in the specific polymer compound include a carboxy group, a sulfonic acid group, a phosphate group, a boronic acid group, an amino group, an ammonium group, or salts thereof. Among these, a carboxy group, a sulfonic acid group, a phosphate group, or salts thereof is preferable, a carboxy group, a sulfonic acid group, or salts thereof is more preferable, and a sulfonic acid group or a salt thereof is even more preferable.

The content of a structural unit having an ionic group (preferably anionic group) in a water-soluble polymer compound can be set to, for example, 10 mass % to 100 mass %, preferably 10 mass % to 90 mass %, more preferably 10 mass % to 70 mass %, even more preferably 10 mass % to 50 mass %, and particularly preferably 20 mass % to 40 mass %, relative to the total mass of the water-soluble polymer compound.

It is more preferable that a specific polymer compound contain a hydrophobic structural unit and a hydrophilic structural unit having an ionic group (preferably an anionic group and particularly preferably a sulfonic acid group).

The specific polymer compound is more likely to exist on the surface of the treatment liquid by containing the hydrophobic structural unit, and therefore, the spreading of ink droplets applied on the recording medium is further promoted and the roughness of an image is further suppressed.

Accordingly, when the specific polymer compound contains the hydrophobic structural unit and the hydrophilic structural unit having an ionic group (preferably an anionic group and particularly preferably a sulfonic acid group), the specific polymer compound is more likely to exist in the vicinity of the surface of the treatment liquid, and therefore, it is possible to obtain an effect which is more excellent in suppressing the roughness.

However, on the other hand, bubbles are easily generated in the treatment liquid and application unevenness of the treatment liquid caused by the bubbles is more easily generated.

Accordingly, when a specific polymer compound contains a hydrophobic structural unit and a hydrophilic structural unit having an ionic group (preferably an anionic group and particularly preferably a sulfonic acid group) is used as the specific polymer compound, the effect of suppressing the application unevenness using the silicone oil is more significantly exhibited.

The content of the hydrophobic structural unit in the specific polymer compound can be set to, for example, 10 mass % to 90 mass %, preferably 30 mass % to 90 mass %, more preferably 50 mass % to 90 mass %, and particularly preferably 60 mass % to 80 mass %, relative to the total mass of the specific polymer compound.

In the specific polymer compound, a structural unit represented by the following general formula (A) is preferable as the hydrophilic structural unit having an ionic group (preferably an anionic group and particularly preferably a sulfonic acid group), and a structural unit represented by the following general formula (B) to be described is preferably used as the hydrophobic structural unit.

—Structural Unit Represented by General Formula (A)—

First, the structural unit represented by the general formula (A) will be described as a preferred example of the hydrophilic structural unit in the specific polymer compound.

[Chem. 6]

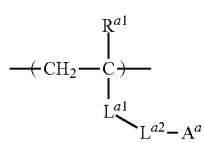

General Formula (A)

In the general formula (A), $R^{a1}$ represents a hydrogen atom or a methyl group.

In the general formula (A), $L^{a1}$ represents a single bond, —COO—, or —CON($R^{a3}$)—. $R^{a3}$ represents a hydrogen atom or a monovalent group, which has 1 to 30 carbon atoms and may include at least one of an ether bond, a thioether bond, and an ester bond.

In the general formula (A), $L^{a2}$ represents a single bond or a divalent linking group, which has 1 to 30 carbon atoms and may include at least one of an ether bond, a thioether bond, and an ester bond.

In the general formula (A), $A^a$ represents an ionic group.

As $R^{a1}$, a hydrogen atom is preferable.

As $L^{a1}$, —COO— or —CON($R^{a3}$)— is preferable, —COO— or —CONH— is more preferable, and —CONH— is particularly preferable.

Examples of the monovalent group, which has 1 to 30 carbon atoms and may include at least one of an ether bond, a thioether bond, and an ester bond in $R^{a3}$, include a monovalent hydrocarbon group having 1 to 30 carbon atoms, or a monovalent group which has 1 to 30 carbon atoms and is composed such that at least one of an ether bond, a thioether bond, and an ester bond, and at least one of hydrocarbon groups are linked together.

Examples of the hydrocarbon group in $R^{a3}$ include an aliphatic hydrocarbon group, an aromatic hydrocarbon group, and a group formed of a combination thereof.

Here, the aliphatic hydrocarbon group, the aromatic hydrocarbon group, and the group formed of a combination thereof in the present invention will be described.

In the present invention, the aliphatic hydrocarbon group is not limited to a linear hydrocarbon group, and may have at least one of a ring structure (alicyclic structure) and a branched structure.

In addition, in the present invention, the aliphatic hydrocarbon group, the aromatic hydrocarbon group, and the group formed of a combination thereof may not be substituted or may be substituted by a substituent. Examples of the substituent include an alkoxy group, a hydroxy group, and a halogen atom.

Specific examples of the aliphatic hydrocarbon group in the present invention include an alkyl group, an alkenyl group, and an alkynyl group. These may have a branched structure or a ring structure. In addition, these may be substituted by a substituent.

Examples of the alkyl group, specifically unsubstituted alkyl group, include a methyl group, an ethyl group, a propyl group, and a butyl group. In addition, examples of the substituted alkyl group include a methoxy group; a hydroxy group; and a methyl group, an ethyl group, a propyl group, and a butyl group which are substituted with a chlorine atom, a bromine atom, a fluorine atom and the like.

Specific examples of the aromatic hydrocarbon group (that is, an aryl group) in the present invention include a phenyl group, or a monovalent group which is derived from a condensed ring type aromatic ring compound having 8 or more carbon atoms or from an aromatic ring compound in which a hetero ring is condensed.

The condensed ring type aromatic ring compound having 8 or more carbon atoms is an aromatic compound which has 8 or more carbon atoms and is composed of an aromatic ring in which two or more benzene ring is condensed, and/or at least one aromatic ring, and alicyclic hydrocarbon in which an aromatic ring is condensed.

Specific examples of the condensed ring type aromatic ring compound having 8 or more carbon atoms include naphthalene, anthracene, fluorene, phenanthrene, and acenaphthene.

Examples of the group formed of a combination of an aliphatic hydrocarbon group and an aromatic hydrocarbon group include an aralkyl group and an alkylaryl group. These may have a branched structure or an alicyclic structure. In addition, these may be substituted by a substituent.

In addition, examples of the "monovalent group which is composed such that at least one of an ether bond, a thioether bond, and an ester bond, and at least one of hydrocarbon groups are linked together" in the present invention include an alkoxy group, an alkylthio group, an alkylcarbonyloxy group, an alkyloxycarbonyl group, an aryloxy group, an arylthio group, an arylcarbonyloxy group, an aryloxycarbonyl group, an alkyloxyaryl group, an aryloxyalkyl group, an alkylthioaryl group, an arylthioalkyl group, an alkylcarbonyloxy aryl group, an arylcarbonyloxy alkyl group, alkyloxycarbonyl aryl group, and an aryloxycarbonyl alkyl group.

The number of carbon atoms of the aliphatic hydrocarbon group in $R^{a3}$ is preferably 1 to 12, more preferably 1 to 8, even more preferably 1 to 6, particularly preferably 1 to 3, and most preferably 1.

The number of carbon atoms of the aromatic hydrocarbon group in $R^{a3}$ is preferably 6 to 16, more preferably 6 to 14, even more preferably 6 to 10, and particularly preferably 6.

The number of carbon atoms of the hydrocarbon group formed of a combination of an aliphatic hydrocarbon group and an aromatic hydrocarbon group in $R^{a3}$ is preferably 7 to 28, more preferably 7 to 15, even more preferably 7 to 12, and particularly preferably 7 to 9.

As $R^{a3}$, a hydrogen atom, an aliphatic hydrocarbon group having 1 to 12 carbon atoms, or a monovalent group, which has 1 to 12 carbon atoms and is composed such that at least one of an ether bond, a thioether bond, and an ester bond, and at least one of hydrocarbon groups are linked together is preferable, a hydrogen atom or an aliphatic hydrocarbon group having 1 to 12 carbon atoms is more preferable, and a hydrogen atom is particularly preferable.

Examples of the divalent linking group, which has 1 to 30 carbon atoms and may include at least one of an ether bond, a thioether bond, and an ester bond in $L^{a2}$ include a divalent hydrocarbon group having 1 to 30 carbon atoms, or a divalent group, which has 1 to 30 carbon atoms and is composed such that at least one of an ether bond, a thioether bond, and an ester bond, and at least one of hydrocarbon groups are linked together.

Examples of the hydrocarbon group in $L^{a2}$ include an aliphatic hydrocarbon group, an aromatic hydrocarbon group, and a group formed of a combination thereof.

Specific examples of the aliphatic hydrocarbon group in $L^{a2}$ include an alkylene group, an alkenylene group, and an alkynylene group, which may have a branched structure or an alicyclic structure.

Examples of the group formed of a combination of an aliphatic hydrocarbon group and an aromatic hydrocarbon group (arylene group) in $L^{a2}$ include an arylenealkylene group and an alkylenearylene group, which may have a branched structure or an alicyclic structure.

Examples of the "divalent group which is composed such that at least one of an ether bond, a thioether bond, and an ester bond, and at least one of hydrocarbon groups are linked together" in $L^{a2}$ include a divalent group in which one hydrogen atom is removed from the group exemplified in the above-described "monovalent group which is composed such that at least one of an ether bond, a thioether bond, and an ester bond, and at least one of hydrocarbon groups are linked together".

The number of carbon atoms of the aliphatic hydrocarbon group in $L^{a2}$ is preferably 1 to 12, more preferably 1 to 8, even more preferably 1 to 6, and particularly preferably 3 to 4.

The number of carbon atoms of the aromatic hydrocarbon group in $L^{a2}$ is preferably 6 to 16, more preferably 6 to 14, even more preferably 6 to 10, and particularly preferably 6.

The number of carbon atoms of the hydrocarbon group formed of a combination of an aliphatic hydrocarbon group and an aromatic hydrocarbon group in $L^{a2}$ is preferably 7 to 28, more preferably 7 to 15, more preferably 7 to 12, and particularly preferably 7 to 9.

As $L^{a2}$, a hydrogen atom, an aliphatic hydrocarbon group having 1 to 12 carbon atoms, or a group, which has 1 to 12 carbon atoms and is composed such that at least one of an ether bond, a thioether bond, and an ester bond, and at least one of hydrocarbon groups are linked together is preferable, a hydrogen atom or an aliphatic hydrocarbon group having 1 to 12 carbon atoms is more preferable, an aliphatic hydrocarbon group having 1 to 12 carbon atoms is even more preferable, and an alkylene group having 1 to 12 carbon atoms is particularly preferable.

Examples of the ionic group represented by $A^a$ include a cationic group and an anionic group, and among these, an anionic group is preferable.

Here, the cationic group represents a group dissociable into a cation, or a group which is dissociated into a cation, and the anionic group represents a group dissociable into an anion, or a group which is dissociated into an anion.

Specific examples of $A^a$ include a carboxy group, a sulfonic acid group, a phosphate group, a boronic acid group, an amino group, an ammonium group, or salts thereof. Among these, from the viewpoint of adequate acidity, a carboxy group, a sulfonic acid group, a phosphate group, or salts thereof is preferable, a carboxy group, a sulfonic acid group, or salts thereof is more preferable, and a sulfonic acid group, or a salt thereof is even more preferable.

The structural unit represented by the general formula (A) may be a structural unit (that is, a structural unit formed by polymerization of a monomer having an ionic group) derived from a monomer having an ionic group, or a structural unit formed by introducing an ionic group after forming a main chain (backbone chain polymer). In the present invention, from the viewpoint of production efficiency and stability, the structural unit derived from a monomer having an ionic group is preferable.

As the monomer having an ionic group, it is possible to use a generally used monomer without limitations.

Examples of a monomer having an anionic group as the ionic group include a monomer having a carboxy group, and specific examples thereof include acrylic acid, methacrylic acid, crotonic acid, itaconic acid, maleic acid, fumaric acid, citraconic acid, and 2-methacryloyloxymethyl succinic acid.

Examples of a monomer having a sulfonic acid group include styrenesulfonic acid, 2-acrylamido-2-methylpropane sulfonic acid, 3-sulfopropyl(meth)acrylate, and bis-(3-sulfopropyl)-itaconate.

Examples of a monomer having a phosphate group include vinyl phosphonic acid, vinyl phosphate, bis(methacryloyloxyethyl)phosphate, diphenyl-2-acryloyloxyethyl phosphate, diphenyl-2-methacryloyloxyethyl phosphate, and dibutyl-2-acryloyloxyethyl phosphate.

The monomer having an anionic group can be used alone or in combination of two or more.

Specific examples of monomers having a cationic group as the ionic group include a monomer disclosed in "Polymer Handbook, 4th edition, John Wiley & Sons" or the like, and these can be used alone or in combination of two or more.

The content of the structural unit represented by the general formula (A) can be set to, for example, 10 mass % to 100 mass %, preferably 10 mass % to 90 mass %, more preferably 10 mass % to 70 mass %, even more preferably 10 mass % to 50 mass %, and particularly preferably 20 mass % to 40 mass % relative to the total mass of the specific polymer compound.

As the combination of the respective groups in the general formula (A), from the viewpoint of more effectively exhibiting the effect of the present invention, a combination, in which $R^{a1}$ is a hydrogen atom, $L^{a1}$ is —COO— or —CONH—, $L^{a2}$ is an alkylene group having 1 to 12 carbon atoms, and $A^a$ is a sulfonic acid group or a salt thereof, is preferable, a combination, in which $L^{a1}$ is —CONH—, $L^{a2}$ is an alkylene group having 3 to 4 carbon atoms, and $A^a$ is a sulfonic acid group or a salt thereof, is more preferable, and a combination, in which $L^{a2}$ is an alkylene group having 4 carbon atoms and $A^a$ is a sulfonic acid group or a salt thereof, is particularly preferable.

Hereinafter, a specific example of a constituent unit represented by the general formula (A) will be described, but the present invention is not limited to the following specific example. In the following specific example, the carboxy group, the sulfonic acid group, and the phosphate group may be set to salts.

[Chem. 7]

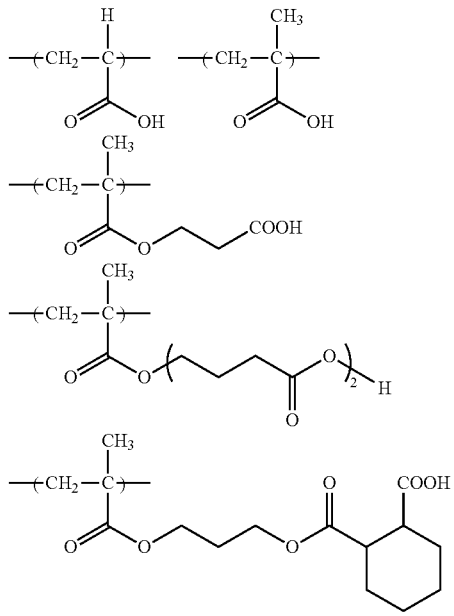

-continued

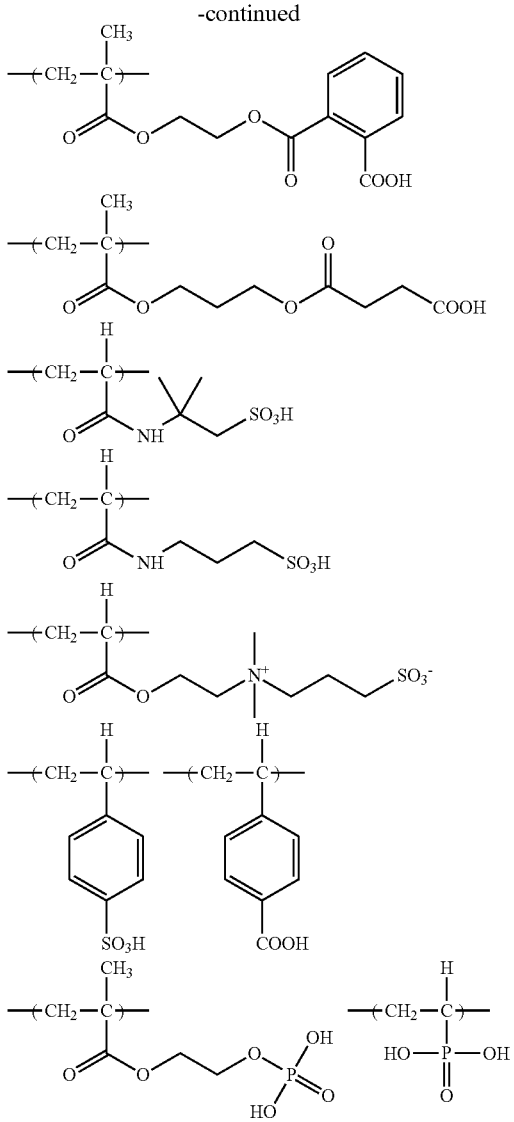

—Structural Unit Represented by General Formula (B)—

Next, the structural unit represented by the general formula (B) will be described as a preferred example of the hydrophobic structural unit in the specific polymer compound.

[Chem. 8]

General Formula (B)

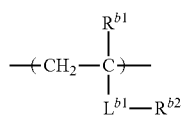

In the general formula (B), $R^{b1}$ represents a hydrogen atom or a methyl group, In the general formula (B), $L^{b1}$ represents a single bond, —COO—, or —CON($R^{b3}$)—, and $R^{b3}$ represents a hydrogen atom or a monovalent group, which has 1 to 30 carbon atoms and may include at least one of an ether bond, a thioether bond, and an ester bond.

In the general formula (B), $R^{b2}$ represents a hydrogen atom or a monovalent group, which has 1 to 30 carbon atoms and may include at least one of an ether bond, a thioether bond, and an ester bond.

However, when $R^{b2}$ is a hydrogen atom, $L^{b1}$ is a single bond.

As $R^{b1}$, a methyl group is preferable.

As $L^{b1}$, —COO— or —CON($R^{b3}$)— is preferable, —COO— or —CONH— is more preferable, and —COO— is particularly preferable.

Examples of the monovalent group, which has 1 to 30 carbon atoms and may include at least one of an ether bond, a thioether bond, and an ester bond in $R^{b3}$, include a monovalent hydrocarbon group having 1 to 30 carbon atoms, or a monovalent group which has 1 to 30 carbon atoms and is composed such that at least one of an ether bond, a thioether bond, and an ester bond, and at least one of hydrocarbon groups are linked together.

Examples of the hydrocarbon group in $R^{b3}$ include an aliphatic hydrocarbon group, an aromatic hydrocarbon group, and a group formed of a combination thereof.

Here, the examples of the aliphatic hydrocarbon group, the aromatic hydrocarbon group, and the group formed of a combination thereof are as described above.

The number of carbon atoms of the aliphatic hydrocarbon group in $R^{b3}$ is preferably 1 to 12, more preferably 1 to 8, even more preferably 1 to 6, particularly preferably 1 to 3, and most preferably 1.

The number of carbon atoms of the aromatic hydrocarbon group in $R^{b3}$ is preferably 6 to 16, more preferably 6 to 14, even more preferably 6 to 10, and particularly preferably 6.

The number of carbon atoms of the hydrocarbon group formed of a combination of an aliphatic hydrocarbon group and an aromatic hydrocarbon group in $R^{b3}$ is preferably 7 to 28, more preferably 7 to 15, even more preferably 7 to 12, and particularly preferably 7 to 9.

A $R^{b3}$, a hydrogen atom, an aliphatic hydrocarbon group having 1 to 12 carbon atoms, or a monovalent group, which has 1 to 12 carbon atoms and is composed such that at least one of an ether bond, a thioether bond, and an ester bond, and at least one of hydrocarbon groups are linked together is preferable, a hydrogen atom or an aliphatic hydrocarbon group having 1 to 12 carbon atoms is more preferable, and a hydrogen atom is particularly preferable.

Examples of the monovalent group, which has 1 to 30 carbon atoms and may include at least one of an ether bond, a thioether bond, and an ester bond in $R^{b2}$ include a monovalent hydrocarbon group having 1 to 30 carbon atoms, or a monovalent group, which has 1 to 30 carbon atoms and is composed such that at least one of an ether bond, a thioether bond, and an ester bond, and at least one of hydrocarbon groups are linked together.

Examples of the hydrocarbon group in $R^{b2}$ include an aliphatic hydrocarbon group, an aromatic hydrocarbon group, and a group formed of a combination thereof.

Here, the examples of the aliphatic hydrocarbon group, the aromatic hydrocarbon group, and the group formed of a combination thereof are as described above.

The number of carbon atoms of the aliphatic hydrocarbon group in $R^{b2}$ in a case where the aliphatic hydrocarbon group contains neither a ring structure nor a branched structure is preferably 1 to 12, more preferably 1 to 8, even more preferably 1 to 6, and particularly preferably 1 to 4. The number of carbon atoms of the aliphatic hydrocarbon group in a case where the aliphatic hydrocarbon group contains a ring structure is preferably 3 to 12, more preferably 6 to 12, and particularly preferably 6 to 10. The number of carbon atoms of the aliphatic hydrocarbon group in a case where the aliphatic hydrocarbon group contains a branched structure is preferably 3 to 12, or 6 to 12, and particularly preferably 6 to 10.

The number of carbon atoms of the aromatic hydrocarbon group in $R^{b2}$ is preferably 6 to 16, more preferably 6 to 14, even more preferably 6 to 10, and particularly preferably 6.

The number of carbon atoms of the group formed of a combination of an aliphatic hydrocarbon group and an aromatic hydrocarbon group in $R^{b2}$ is preferably 7 to 28, more preferably 7 to 15, even more preferably 7 to 12, and particularly preferably 7 to 9.

As $R^{b2}$, an aliphatic hydrocarbon group (that is, a linear or branched aliphatic hydrocarbon group or an aliphatic hydrocarbon group which has an alicyclic structure); a group (preferably aralkyl group) formed of a combination of an aliphatic hydrocarbon group and an aromatic hydrocarbon group; a monovalent group (preferably aryloxy group) composed such that at least one of an ether bond, a thioether bond, and an ester bond, and at least one of aliphatic hydrocarbon groups are linked together; and a monovalent group (preferably aryloxyalkyl group) composed such that at least one of an ether bond, a thioether bond, and an ester bond, an aliphatic hydrocarbon group, and an aromatic hydrocarbon group are linked together are preferable.

As $R^{b2}$, an aliphatic hydrocarbon group (that is, a linear or branched aliphatic hydrocarbon group or an aliphatic hydrocarbon group which has an cyclic structure); a group (preferably aralkyl group) formed of a combination of an aliphatic hydrocarbon group and an aromatic hydrocarbon group and a monovalent group (preferably aryloxyalkyl group) composed such that an aliphatic hydrocarbon group and an aromatic hydrocarbon group are linked together by at least one of an ether bond, a thioether bond, and an ester bond are more preferable.

As $R^{b2}$, a group (preferably aralkyl group) formed of a combination of an aliphatic hydrocarbon group and an aromatic hydrocarbon group and a monovalent group (preferably aryloxyalkyl group) composed such that an aliphatic hydrocarbon group and an aromatic hydrocarbon group are linked together by at least one of an ether bond, a thioether bond, and an ester bond are more preferable.

As $R^{b2}$, a group (preferably aralkyl group) formed of a combination of an aliphatic hydrocarbon group and an aromatic hydrocarbon group is particularly preferable.

In addition, as specific forms of $R^{b2}$, from the viewpoint of more effectively exhibiting the effect according to the present invention, a linear aliphatic hydrocarbon group having 1 to 12 carbon atoms, an aliphatic hydrocarbon group having a branched structure and 3 to 12 carbon atoms, an aliphatic hydrocarbon group having a ring structure and 3 to 12 carbon atoms, an aralkyl group having 7 to 12 carbon atoms, or an aryloxyalkyl group having 7 to 12 carbon atoms is preferable, an aliphatic hydrocarbon group having a branched structure and 3 to 12 carbon atoms, an aliphatic hydrocarbon group having a ring structure and 3 to 12 carbon atoms, an aralkyl group having 7 to 12 carbon atoms, or an aryloxyalkyl group having 7 to 12 carbon atoms is more preferable, an aralkyl group having 7 to 12 carbon atoms, or an aryloxyalkyl group having 7 to 12 carbon atoms is even more preferable, and an aralkyl group having 7 to 12 carbon atoms is particularly preferable.

In addition, as the combination of respective groups in the general formula (B), a combination, in which $R^{b1}$ is a hydrogen atom or a methyl group, $L^{b1}$ is —COO—, and $R^{b2}$ is a linear aliphatic hydrocarbon group having 1 to 12 carbon atoms, an aliphatic hydrocarbon group which has a branched structure and has 3 to 12 carbon atoms, an aliphatic hydrocarbon group which has a ring structure and has 3 to 12 carbon atoms, an aralkyl group having 7 to 12 carbon atoms, or an aryloxyalkyl group having 7 to 12 carbon atoms, is preferable, a combination, in which $R^{b1}$ is a methyl group and $R^{b2}$ is an aliphatic hydrocarbon group which has a branched structure and has 3 to 12 carbon atoms, an aliphatic hydrocarbon group which has a ring structure and has 3 to 12 carbon atoms, an aralkyl group having 7 to 12 carbon atoms, or an aryloxyalkyl group having 7 to 12 carbon atoms, is more preferable, and a combination, in which $R^{b1}$ is a methyl group and $R^{b2}$ is an aralkyl group having 7 to 12 carbon atoms, or an aryloxyalkyl group having 7 to 12 carbon atoms, is particularly preferable.

The structural unit represented by the general formula (B) is preferably a structural unit derived from the following monomers.

That is, specific examples of the monomers constituting the structural unit represented by the general formula (B) include a styrene, α-methyl styrene, methyl(meth)acrylate, ethyl(meth)acrylate, n-propyl(meth)acrylate, isopropyl (meth)acrylate, n-butyl(meth)acrylate, isobutyl(meth)acrylate, sec-butyl(meth)acrylate, tert-butyl(meth)acrylate, amyl (meth)acrylate, hexyl(meth)acrylate, 2-ethylhexyl(meth) acrylate, octyl(meth)acrylate, tert-octyl(meth)acrylate, stearyl(meth)acrylate, 2-chloroethyl(meth)acrylate, 2-bromoethyl(meth)acrylate, 4-chlorobutyl(meth)acrylate, cyanoethyl(meth)acrylate, 2-acetoxyethyl(meth)acrylate, benzyl (meth)acrylate, chlorobenzyl(meth)acrylate, methoxybenzyl (meth)acrylate, 2-chloro-cyclohexyl(meth)acrylate, cyclohexyl(meth)acrylate, norbornyl(meth)acrylate, isobornyl(meth)acrylate, furfuryl(meth)acrylate, tetrahydrofurfuryl(meth)acrylate, phenyl(meth)acrylate, cresyl(meth)acrylate, naphthyl(meth)acrylate, 2-phenoxyethyl(meth) acrylate, 2-hydroxyethyl(meth)acrylate, 4-hydroxybutyl (meth)acrylate, 5-hydroxy pentyl(meth)acrylate, 2,2-dimethyl-3-hydroxypropyl(meth)acrylate, triethylene glycol mono(meth)acrylate, dipropylene glycol mono(meth)acrylate, 2-methoxyethyl(meth)acrylate, 3-methoxy butyl(meth) acrylate, 2-ethoxyethyl(meth)acrylate, methoxy diethylene glycol(meth)acrylate, 2-iso-propoxy-ethyl(meth)acrylate, 2-butoxyethyl(meth)acrylate, 2-(2-methoxy ethoxy)ethyl (meth)acrylate, 2-(2-ethoxyethoxy)ethyl(meth)acrylate, 2-(2-butoxyethoxy)ethyl(meth)acrylate, 2-(3-phenylpropyloxy)ethyl(meth)acrylate, 2-acetoxyethyl methacrylate, 2-acetoacetoxyethyl methacrylate, allyl methacrylate, glycidyl methacrylate, 1-bromo-2-methoxyethyl acrylate, 1,1-dichloro-2-ethoxyethyl acrylate, 2,2,2-tetrafluoro ethyl acrylate, and 1H,1H,2H,2H-perfluorodecyl acrylate.

Here, (meth)acrylate indicates acrylate or methacrylate.

It is considered that in order for the specific polymer compound to exist in the vicinity of the surface of a treatment liquid which is applied on a recording medium, a specific polymer compound having low fluidity is preferable while heating and drying the treatment liquid. For this reason, in general, a specific polymer compound which has a high glass transition temperature correlating with a softening temperature of a polymer compound is preferable as the specific polymer compound. From the viewpoint, methacrylate is more preferable than acrylate as the monomer forming the structural unit represented by the general formula (B).

In a case where the specific polymer compound contains one or more structural units represented by the general formula (B), the total content of the structural units can be set to, for example, 10 mass % to 90 mass %, preferably 30 mass % to 90 mass %, more preferably 50 mass % to 90 mass %, and particularly preferably 60 mass % to 80 mass %, relative to the total mass of the specific polymer compound.

It is more preferable that the specific polymer compound contain at least one of structural units represented by the general formula (B), in addition to structural units represented by the general formula (A). From the viewpoint of easy control of "hydrophilicity" and "nature of existing in the vicinity of the surface of a treatment liquid" of the specific polymer compound by adjusting the composition ratio of the structural units, it is particularly preferable that the specific polymer compound contain three or more structural units selected from a group consisting of structural units represented by the general formula (A) and structural units represented by the general formula (B).

The specific polymer compound in the present invention may contain other structural units in addition to the structural units represented by the general formula (A) and the structural units represented by the general formula (B) as necessary.

As the other structural units, for example, it is possible to use structural units other than the structural units represented by the general formula (A) and the structural units represented by the general formula (B) among well-known structural units derived from a vinyl monomer.

The weight average molecular weight of the specific polymer compound is not particularly limited, but can be set to, for example, 10000 to 100000, preferably 20000 to 80000, and more preferably 30000 to 80000.

In addition, the content of the specific polymer compound in a treatment liquid in the present invention is not particularly limited, but is preferably 0.1 mass % to 10 mass %, more preferably 0.1 mass % to 4 mass %, even more preferably 0.1 mass % to 2 mass %, and particularly preferably 0.1 mass % to 1 mass %, relative to the total amount of the treatment liquid.

When the content of the specific polymer compound in the treatment liquid is 0.1 mass % or greater, it is possible to further promote the spreading of ink droplets, and when the content of the specific polymer compound in the treatment liquid is 10 mass % or less, it is possible to further suppress thickening of the treatment liquid. In addition, when the content of the specific polymer compound in the treatment liquid is 10 mass % or less, it is possible to further suppress the application unevenness of the treatment liquid caused by bubbles in the treatment liquid.

It is possible to synthesize the specific polymer compound through a well-known synthesis method in which a monomer component containing at least a monomer for forming a structural unit represented by the general formula (A) (preferably further containing a monomer for forming a structural unit represented by the general formula (B)) is homopolymerized or copolymerized through various polymerization methods, for example, solution polymerization, precipitation polymerization, suspension polymerization, mass polymerization, and emulsion polymerization.

The polymerization reaction can be performed through a well known operation such as a semi-continuous system or a continuous system. Examples of methods of initiating polymerization include a method of using a polymerization initiator and a method of radiating light or radiation. The polymerization methods or the methods of initiating polymerization are disclosed in, for example, Teiji TSURUDA, "Polymer Synthesis Method", Revised Edition (published by Nikkan Kogyo Shimbun, Ltd., 1971), or Joint Authors of Takayuki OTSU and Masaetsu KINOSHITA, "Test Method of Polymer Synthesis", Kagakudojin, Published in 1972, pp 124 to 154.

Among the various polymerization methods, the solution polymerization method using a polymerization initiator (for example, a radical polymerization initiator) is particularly preferable. Examples of a solvent used in the solution polymerization may include a compound consisting of one or more various organic solvents such as ethyl acetate, butyl acetate, acetone, methyl ethyl ketone, methyl isobutyl ketone, cyclohexanone, tetrahydrofuran, dioxane, N,N-dimethylformamide, N,N-dimethylacetamide, benzene, toluene, acetonitrile, methylene chloride, chloroform, dichloroethane, methanol, ethanol, 1-propanol, 2-propanol, and 1-butanol, or may be a solvent mixed with water.

The polymerization temperature can be set in association with the molecular weight of a produced polymer, the type of an initiator, and is generally about 0° C. to 100° C. However, the polymerization is preferably performed within a range of 50° C. to 100° C. The reaction time is preferably about 1 hour to 30 hours. The obtained polymer may be subjected to purification such as reprecipitation.

Hereinafter, exemplary compounds (A-1 to A-29) of the specific polymer compound will be shown, but the present invention is not limited thereto. In the following structure, Modification example is a methyl group and Et is an ethyl group.

[Chem. 9]

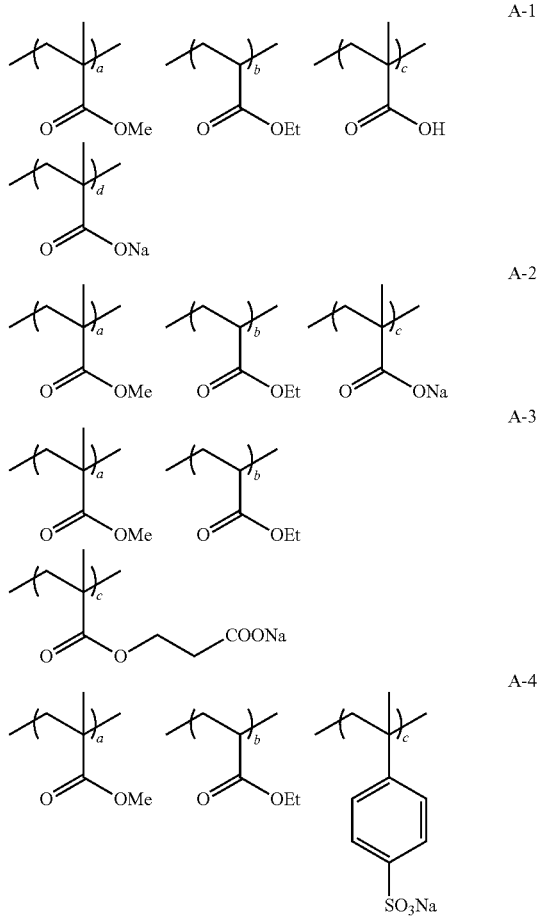

-continued
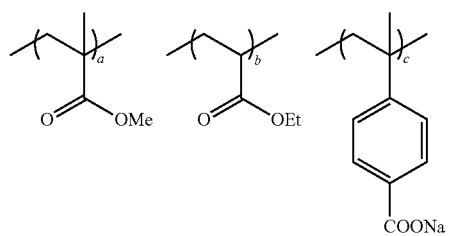
A-5
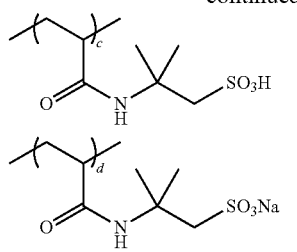
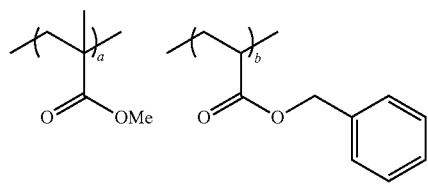
A-6
A-12
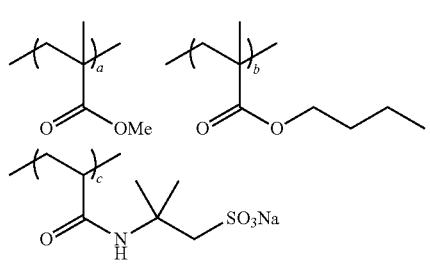
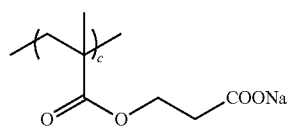
A-7
A-13
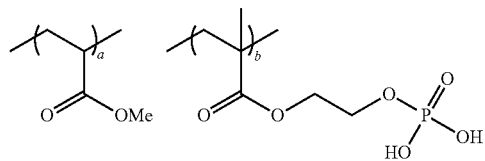
[Chem. 10]
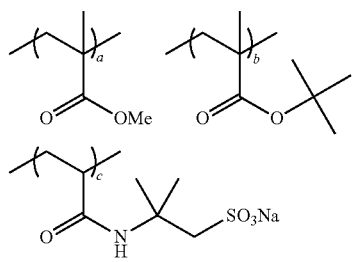
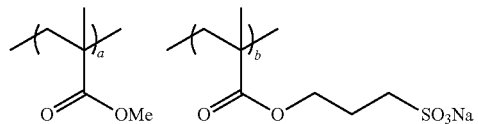
A-8
A-14
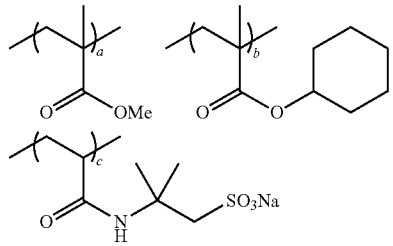
A-9
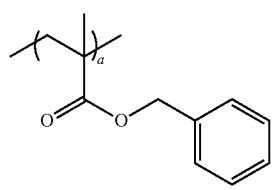
A-15
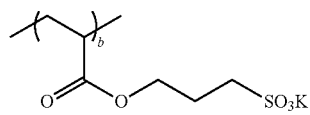
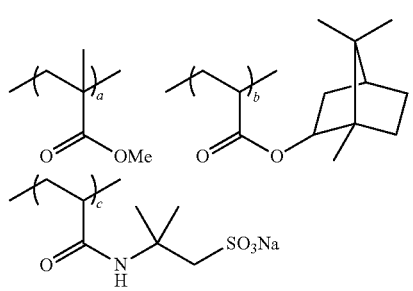
A-10
[Chem. 11]
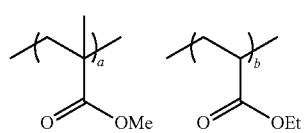
A-16
A-11
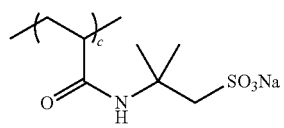
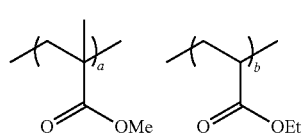

-continued

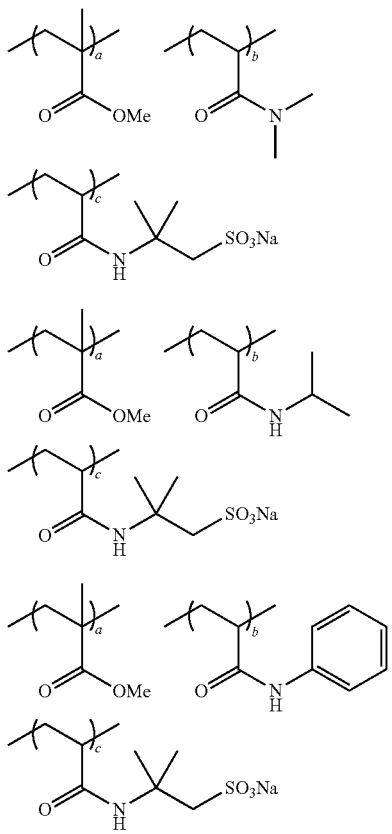

In the exemplary compounds A-1 to A-29, a, b, c, and d indicates the content ratio (mass %) of each structural unit. The total of a, b, c, and d is 100.

In the exemplary compounds A-1 to A-29, a combination in which a is 0 to 73, b is 0 to 90, c is 10 to 90, and d is 0 to 90 is suitable.

Specific examples of the combinations of a/b/c/d in the exemplary compounds A-1 to A-29 include 5/5/90/0, 33/33/34/0, 17/50/33/0, 50/17/33/0, 50/20/30/0, 56/17/27/0, 60/13/27/0, 70/3/27/0, 90/0/10/0, 73/0/27/0, 50/0/50/0, 20/0/80/0, 10/0/90/0, 0/90/10/0, 0/77/23/0, 0/50/50/0, 0/20/80/0, 40/30/27/3, 34/30/27/9, and 18/40/27/15.

(Water)

The treatment liquid in the present invention contains water.

The content of water is not particularly limited, but a range of 10 mass % to 99 mass % is preferable, a range of 50 mass % to 90 mass % is more preferable, and a range of 60 mass % to 80 mass % is even more preferable.

(Arbitrary Components)

—Silicone Oil—

It is preferable that the treatment liquid contain at least one silicone oil.

It is possible to suppress application unevenness of a treatment liquid caused by bubbles in the treatment liquid by making the treatment liquid contain silicone oil.

In general, an antifoaming agent is used for suppressing bubbles in a liquid. However, application unevenness of a treatment liquid is more easily suppressed using the silicone oil compared to a case of using antifoaming agents other than the silicone oil.

The silicone oil is not particularly limited, and a silicone oil (modified silicone oil such as hydrophilic silicone oil is included in the concept of the silicone oil), which is used as an active ingredient of a well-known silicone antifoaming agent can be appropriately selected and used.

The silicone oil is not particularly limited and examples thereof include organopolysiloxane of dimethyl polysiloxane; and modified organopolysiloxane such as polyoxyalkylene-modified organopolysiloxane. These may be used singly or in combination of two or more.

For example, silicone oil disclosed in JP1995-090128B (JP-H07-090128B) or silicone oil disclosed in JP3976113 can be used as the silicone oil.

From the viewpoint of antifoaming property, silicone oil having a viscosity of 100 mm$^2$/s to 100,000 mm$^2$/s at 25° C. is preferable as the silicone oil.

From the viewpoint of further suppressing the generation of bubbles in a treatment liquid and suppressing application unevenness caused by the bubbles, forms in which silicone oil is dispersed in the treatment liquid are preferable as the forms in which the silicone oil is contained in the treatment liquid.

Among them, a form in which silicone oil is dispersed in a treatment liquid using a surfactant (that is, a form in which silicone oil is emulsified and dispersed in a treatment liquid) is more preferable.

As a specific method for providing the form in which silicone oil is dispersed in a treatment liquid using a surfactant, a method of using an emulsion type silicone antifoaming agent, to be described later, while producing a treatment liquid is suitable.

The surfactant for dispersing silicone oil is not particularly limited, and any surfactant which can emulsify and disperse silicone oil in a treatment liquid that contains water can be appropriately selected and used.

A nonionic surfactant is suitable for the surfactant for dispersing silicone oil.

Specifically, a surfactant which is exemplified as a surface tension adjusting agent to be described later can be used as the surfactant for dispersing silicone oil, for example.

A well-known method of incorporating a silicone antifoaming agent into a treatment liquid is suitable for the method of incorporating silicone oil into the treatment liquid.

Here, the silicone antifoaming agent is an antifoaming agent containing silicone oil as an active ingredient.

Examples of the forms of the silicone antifoaming agent include various forms such as an oil type silicone antifoaming agent, a compound type silicone antifoaming agent, an emulsion type silicone antifoaming agent, and a self-emulsifying type silicone antifoaming agent.

The oil type silicone antifoaming agent indicates the silicone oil itself (also including modified silicone oil such as hydrophilic silicone oil). The hydrophilic silicone oil is also called a "hydrophilic oil type silicone antifoaming agent" or the like.

The compound type silicone antifoaming agent is in a form in which particles such as silica or alumina are dispersed in the oil type silicone antifoaming agent to improve the anti-foaming property.

The emulsion type silicone antifoaming agent is in a form in which the compound type silicone antifoaming agent is made into an O/W type emulsion using an emulsifier (surfactant) to improve dispersibility of the compound type silicone antifoaming agent in water.

The self-emulsifying type silicone antifoaming agent is in a form in which the self-emulsifying type silicone antifoaming agent contains silicone oil and silica and easily becomes the O/W type emulsion when diluted with water.

As the silicone antifoaming agents, a compound type silicone antifoaming agent, an emulsion type silicone antifoaming agent, and a self-emulsifying type silicone antifoaming agent, which contain silica particles excellent in anti-foaming property, are preferable.

Among them, an emulsion type silicone antifoaming agent is preferable in that the effect of suppressing application unevenness is particularly significant.

A commercially available product can be used as the silicone antifoaming agent.

Examples of the commercially available silicone antifoaming agent include KS-508, KS-531, KS-537, KS-604, KM-72, KM-72F, KM-90, and KM-98 (all are manufactured by Shin-Etsu Chemical Co., Ltd.); SF-8427, SF-8428, SH-3749, SH-8400, FZ-2101, FZ-2104, FZ-2118, FZ-2203, and FZ-2207 (all are manufactured by Dow Corning Toray Co., Ltd.); BYK-345, BYK-346, and BYK-348 (all are manufactured by BYK Japan KK.); and TSA-739, TSA-7341, TSA-732, TSA-732A, TSA-772, TSA-730, TSA-770, TSA-775, YMA6509, TSA-737, TSA-737F, YSA-6406, and TSA-780 (all are manufactured by Momentive Performance Materials Japan Limited Liability Co.).

The content of silicone oil in a treatment liquid is not particularly limited. However, from the viewpoint of further suppressing deterioration of surface tension of a treatment liquid due to the addition of the silicone oil and of further suppressing roughness of an image, the content thereof relative to the total amount of the treatment liquid is preferably 1500 ppm or less, more preferably 1000 ppm or less, and particularly preferably 500 ppm or less. The content of the silicone oil relative to the total amount of the water-soluble polymer compound is preferably 30.0 mass % or less, more preferably 20.0 mass % or less, and particularly preferably 10.0 mass % or less.

The lower limit of the content of silicone oil in a treatment liquid is not particularly limited. From the viewpoint of further suppressing application unevenness of the treatment liquid, the lower limit of the content of silicone oil in the treatment liquid relative to the total amount of the treatment liquid is preferably 5 ppm, more preferably 10 ppm, and particularly preferably 50 ppm. The lower limit of the content of silicone oil in the treatment liquid relative to the total amount of the water-soluble polymer compound is preferable 0.1 mass %, more preferably 0.2 mass %, and particularly preferably 1.0 mass %.

In the present invention, the unit "ppm" is on a mass basis.

—Phosphoric Acid and Phosphoric Acid Compound—

The treatment liquid in the present invention may contain at least one of phosphoric acid and a phosphoric acid compound as inorganic acid. Accordingly, uneven glossiness of an image is suppressed. It is considered that the uneven glossiness of an image is caused by a reaction between a component (for example, calcium carbonate) in a recording medium and an organic acidic compound in a treatment liquid.

For example, phosphorous acid, hypophosphorous acid, pyrophosphoric acid, metaphosphoric acid, polyphosphoric acid, or salts thereof can be used as the phosphoric acid compound.

The content of the total organic acidic compound relative to the total amount of the total organic acidic compound, phosphoric acid, and phosphoric acid compound in the treatment liquid in the present invention is not particularly limited, but is preferably 60 mass % to 90 mass %. When the content of the total organic acidic compound relative to the total amount of the organic acidic compound, phosphoric acid, and phosphoric acid compound is 60 mass % or greater, the roughness of an image is further suppressed. In addition, when the content of the total organic acidic compound relative to the total amount of the organic acidic compound, phosphoric acid, and phosphoric acid compound is 90 mass % or less, the uneven glossiness of an image is further suppressed and the scratch resistance of an image is further improved.

(Organic Solvent)

It is preferable that the treatment liquid in the present invention contain at least one selected from organic solvents.

Organic solvents (hereinafter, also referred to as "water-soluble organic solvents") of which 5 g or greater is dissolved in 100 g of water at 20° C. is preferable as the organic solvents.

The same water-soluble organic solvents as those contained in an ink which are to be described later can be used as the water-soluble organic solvents. Among these, from the viewpoint of suppressing curling, polyalkylene glycol or a derivative thereof is preferable, and at least one selected from diethylene glycol monoalkyl ether, triethylene glycol monoalkyl ether, dipropylene glycol, tripropylene glycol monoalkyl ether, polyoxypropylene glyceryl ether, and polyoxyethylene polyoxypropylene glycol is more preferable.

The content rate of the organic solvents in a treatment liquid is not particularly limited. However, from the viewpoint of suppressing curling, the content rate thereof relative to the total amount of the treatment liquid is preferably 1 mass % to 30 mass % and more preferably 5 mass % to 15 mass %.

(Nitrogen-Containing Heterocyclic Compound and Organic Mercapto Compound)

The treatment liquid in the present invention may contain at least one selected from a nitrogen-containing heterocyclic compound and an organic mercapto compound. Accordingly, the scratch resistance of an image and the conveyance property of a recording medium are improved. Among them, a nitrogen-containing heterocyclic compound is preferable.

—Nitrogen-Containing Heterocyclic Compound—

As the structure of the nitrogen-containing heterocyclic compound, a nitrogen-containing 5-membered ring structure or a nitrogen-containing 6-membered ring structure is preferable, and among them, a nitrogen-containing 5-membered ring structure is more preferable.

In the nitrogen-containing 5-membered ring structure or the nitrogen-containing 6-membered ring structure, a 5- or 6-membered heterocyclic structure, which preferably includes at least one of a carbon atom, a nitrogen atom, an oxygen atom, a sulfur atom, and a selenium atom, is preferable. The heterocycle may be condensed with a carbon aromatic ring or a heteroaromatic ring.

Examples of the heterocycle include a tetrazole ring, a triazole ring, an imidazole ring, a thiadiazole ring, an oxadiazole ring, a selenadiazole ring, an oxazole ring, a thiazole ring, a benzoxazole ring, a benzothiazole ring, a benzimidazole ring, a pyrimidine ring, a triazaindene ring, a tetraazaindene ring, and a pentaazaindene ring.

These rings may have a substituent, and the substituent may be substituted by a nitro group, a halogen atom (for example, a chlorine atom, a bromine atom), a mercapto group, a cyano group, each substituted or unsubstituted alkyl group (for example, each of the groups of methyl, ethyl, propyl, t-butyl, and cyanoethyl), an aryl group (for example, each of the groups of phenyl, 4-methanesulfonamido-phenyl, 4-methylphenyl, 3,4-dichlorophenyl, and naphthyl), an alkenyl group (for example, an allyl group), an aralkyl group (for example, each of the groups of benzyl, 4-methylbenzyl, and phenethyl), a sulfonyl group (for example, each of the groups of methanesulfonyl, ethanesulfonyl, and p-toluenesulfonyl), a carbamoyl group (for example, each of the groups of unsubstituted carbamoyl, methylcarbamoyl, and phenylcarbamoyl), a sulfamoyl group (for example, each of the groups of unsubstituted sulfamoyl, methyl sulfamoyl, and phenylsulfamoyl), a carbonamide group (for example, each of the groups of acetamide and benzamide), a sulfonamide group (for example, each of the groups of methane sulfonamide, benzene sulfonamide, and p-toluene sulfonamide), an acyloxy group (for example, each of the groups of acetyl-oxy and benzoyloxy), a sulfonyloxy group (for example, methanesulfonyloxy), a ureido group (for example, each of the groups of unsubstituted ureido, methylureido, ethylureido, and phenyl ureido), an acyl group (for example, each of the groups of acetyl and benzoyl), an oxycarbonyl group (for example, each of the groups of methoxycarbonyl, and phenoxycarbonyl), an oxycarbonylamino group (for example, each of the groups of methoxycarbonylamino, phenoxycarbonylamino, and 2-ethylhexyloxycarbonylamino), and a hydroxyl group. The substituent may be plurally substituted with one ring.

Specific examples of preferred nitrogen-containing heterocyclic compound include the following.

That is, examples thereof include imidazole, benzimidazole, benzoindazole, benzotriazole, tetrazole, benzoxazole, benzothiazole, pyridine, quinoline, pyrimidine, piperidine, piperazine, quinoxaline, and morpholine. These may have a substituent such as an alkyl group, a carboxy group, and a sulfo group.

As preferred nitrogen-containing 6-membered compounds, there are compounds having a triazine ring, a pyrimidine ring, a pyridine ring, a pyrroline ring, a piperidine ring, a pyridazine ring, and a pyrazine ring. Among these, compounds having a triazine ring and a pyrimidine ring are more preferable. The nitrogen-containing 6-membered compounds may have a substituent, and in this case, examples of the substituent include an alkyl group having 1 to 6 carbon atoms, more preferably an alkyl group having 1 to 3 carbon atoms; an alkoxy group having 1 to 6 carbon atoms, more preferably an alkoxy group having 1 to 3 carbon atoms; a hydroxyl group; a carboxy group; a mercapto group; an alkoxyalkyl group having 1 to 6 carbon atoms, more preferably an alkoxyalkyl group having 1 to 3 carbon atoms; and hydroxyalkyl group having 1 to 6 carbon atoms, more preferably a hydroxyalkyl group having 1 to 3 carbon atoms.

Specific examples of preferred nitrogen-containing 6-membered compound include triazine, methyl triazine, dimethyl triazine, a hydroxy ethyl triazine ring, pyrimidine, 4-methyl pyrimidine, pyridine, and pyrroline.

—Organic Mercapto Compound—

Examples of the organic mercapto compound include an alkyl mercapto compound, an arylmercapto compound, and a heterocyclic mercapto compound.

Examples of the alkyl mercapto compound include cysteine and thiomalate. Examples of the arylmercapto compound include thiosalicylic acid. Examples of the heterocyclic mercapto compound include 2-phenyl-1-mercaptotetrazole, 2-mercaptobenzimidazole, 2-mercaptobenzothiazole, 2-mercapto benzoxazole, 2-mercapto pyrimidine, 2,4-dimercaptopyrimidine, and 2-mercaptopyridine, and these may have a substituent such as an alkyl group, a carboxy group, and a sulfo group.

Among the nitrogen-containing heterocyclic compounds and the organic mercapto compounds, benzotriazole, 5-methylbenzotriazole, 5-aminobenzotriazole, 5-chlorobenzotriazole, tetrazole, 5-aminotetrazole, 5-methyltetrazole, and 5-phenyltetrazole are particularly preferable, and benzotriazole is most preferable.

The nitrogen-containing heterocyclic compound and the organic mercapto compound can be used alone or in combination of plural kinds thereof.

The content (total content) of the nitrogen-containing heterocyclic compound and the organic mercapto compound in a treatment liquid is not particularly limited, but the content thereof relative to the total amount of the treatment liquid is preferably 0.1 mass % to 5.0 mass % and more preferably 0.1 mass % to 3.0 mass %.

(Surfactant)

The treatment liquid in the present invention may contain at least one surfactant. The surfactant can be used as a surface tension adjusting agent. Examples of the surface tension adjusting agent include a nonionic surfactant, a cationic surfactant, an anionic surfactant, and a betaine surfactant.

Among these, from the viewpoint of the aggregation rate of an ink composition, a nonionic surfactant or an anionic surfactant is preferable.

As specific examples of the surfactant, anionic surfactants such as fatty acid salts, alkylsulfuric acid ester salts, alkylbenzene sulfonate, alkyl naphthalene sulfonate, dialkyl sulfosuccinate, alkyl phosphate ester salts, naphthalene sulfonic acid formalin condensate, and polyoxyethylene alkylsulfuric acid ester salt; and nonionic surfactants such as polyoxyethylene alkyl ether, polyoxyethylene alkyl allyl ether, polyoxyethylene fatty acid ester, sorbitan fatty acid ester, polyoxyethylene sorbitan fatty acid ester, polyoxyethylene alkyl amine, glycerin fatty acid ester, and oxyethylene oxypropylene block copolymers are preferable. In addition, Surfynols (Air Products and Chemicals, Inc.) which is an acetylene-based polyoxyethylene oxide surfactant is also preferably used. In addition, an amine oxide type amphoteric surfactant or the like such as N,N-dimethyl-N-alkyl amine oxide is also preferable.

Furthermore, surfactants which are disclosed in JP1984-157636A (JP-S59-157636A), pp. 37 and 38, and in Research Disclosure No. 308119 (1989) can also be used as the surfactants.

In addition, examples thereof also include fluorine-based (fluorinated alkyl-based) surfactants, silicone-based surfactants, and the like disclosed in JP2003-322926A, JP2004-325707A, and JP2004-309806A.

The content of the surfactant in a treatment liquid is not particularly limited. However, it is possible to adjust the surface tension of the treatment liquid by adding the surfactant, and the content thereof is preferably set such that the surface tension of the treatment liquid becomes 40 mN/m or greater. In the range, from the viewpoint of suppressing occurrence of curling in a recording medium, the content thereof is preferably 40 mN/m to 60 mN/m, more preferably 42 mN/m to 50 mN/m, and even more preferably 42 mN/m to 47 mN/m.

The surface tension of the treatment liquid is measured under a condition of 25° C. through a plate method using Automatic Surface Tensiometer CBVP-Z (manufactured by Kyowa Interface Science Co., Ltd.).

(Other Aggregating Components)

The treatment liquid in the present invention can contain other aggregating components in addition to the above-described organic acidic compound as long as the effect of the present invention is not damaged. Examples of other aggregating agents include polyvalent metal salts and polyallylamine.

Examples of the polyvalent metal salts include alkaline earth metal (for example, magnesium and calcium) of group 2 in the periodic table, transition metal (for example, lanthanum) of group 3 in the periodic table, cation (for example, aluminum) of group 13 in the periodic table, salts of lanthanides (for example, neodymium), polyallylamine, and polyallylamine derivatives. As salts of metal, carboxylates (such as formic acid, acetic acid, and benzoate), nitrates, chlorides, and thiocyanates are suitable. Among these, calcium salts or magnesium salts of carboxylic acid (such as formic acid, acetic acid, and benzoate), calcium salts or magnesium salts of nitric acid, calcium chloride, magnesium chloride, and calcium salts or magnesium salts of thiocyanic acid are preferable.

The content of the polyvalent metal salts in a treatment liquid can be set to, for example, 1 mass % to 10 mass %.

—Other Additives—

The treatment liquid in the present invention can be configured to include other additives.

Examples of the other additives include well-known additives such as anti-fading agents, emulsion stabilizers, penetration enhancers, ultraviolet absorbers, preservatives, antifungal agents, pH adjusting agents, viscosity modifiers, dispersion stabilizers, rust inhibitors, and chelating agents. In addition, antifoaming agents other than the silicone oil may be included within a range not damaging the effect of the present invention.

In addition, it is preferable that the treatment liquid in the present invention not substantially contain a colorant such as a pigment, and specifically, the content of the colorant relative to the total amount of the treatment liquid be less than 1 mass % (more preferably 0.5 mass % or less, and even more preferably 0.1 mass % or less).

From the viewpoint of the aggregation rate of an ink composition, the pH (at 25° C.±1° C.) of the treatment liquid in the present invention is preferably 3.5 or less, more preferably 0.5 to 2.5, and even more preferably 0.5 to 2.0.

From the view point of the aggregation rate of an ink composition, the viscosity of the treatment liquid is preferably in the range of 1 mPa·s to 30 mPa·s, more preferably in the range of 1 mPa·s to 20 mPa·s, even more preferably in the range of 2 mPa·s to 15 mPa·s, and particularly preferably in the range of 2 mPa·s to 10 mPa·s. The viscosity thereof is measured under a condition of 25° C. using VISCOMETER TV-22 (manufactured by Told Sangyo Co., Ltd.).

<Ink Applying Step>

The ink applying step in the present invention corresponds to image formation, and an ink composition containing a pigment, a pyrrolidone derivative, a specific glycerin-based compound, and water is applied on a treatment liquid-applied surface of a recording medium which was subjected to a treatment liquid applying step.

The image forming method of the present invention suppresses soaking of an ink composition in a recording medium and prevents bleeding, by applying a treatment liquid on the recording medium before forming an image using the ink composition. Furthermore, scratch resistance is imparted to an image on the surface of the recording medium by forming the image using the ink composition which contains at least a pyrrolidone derivative and a specific glycerin-based compound. Accordingly, the image on the surface of the recording medium is hardly damaged even if the image receives an external load.

Particularly, even in an environment in which the image easily receives an external load, for example, an environment in which the recording medium is conveyed at a conveyance speed of 50 m/min or higher, an image which has excellent abrasion resistance and high resolution is formed by forming the image through the image forming step of the present invention.

The higher the conveyance speed of the recording medium in the ink applying step is, the greater the external load on the image formed on the recording medium is. However, the image which can be obtained through the image forming method of the present invention has excellent abrasion resistance, and therefore, it is possible to form multiple images at a high speed by setting the conveyance speed of the recording medium to 80 m/min or higher. In general, when the conveyance speed of the recording medium is fast, the deposited ink composition rapidly penetrates into the recording medium, or when the image cannot maintain a certain degree of strength for a short period of time, recording media undergo abrasion, and the image quality is likely to deteriorate. This phenomenon is particularly likely to occur at a conveyance speed in the range of 80 m/min or higher.

From the viewpoint of increasing the speed of image formation, it is preferable that the conveyance speed be faster, and the conveyance speed is more preferably 100 m/min or higher, and even more preferably 150 m/min or higher. The upper limit of the conveyance speed is not particularly limited, but from the viewpoint of the necessity of conveying a recording medium stably, the upper limit of the conveyance speed is desirably 350 m/min.

When applying an ink composition on a treatment liquid-applied surface of a recording medium, it is possible to use the same methods as those of applying the treatment liquid on the recording medium. Among these, from the viewpoint of improving the resolution of the image, it is preferable to apply the ink composition through an inkjet method.

The formation of an image using an inkjet method can be performed by ejecting an ink composition on a desired recording medium by supplying energy. Meanwhile, in regard to a preferred image forming method of the present invention, the method described in paragraphs 0093 to 0105 of JP2003-306623A can be applied.

The inkjet method is not particularly limited, and may be of any well-known system, for example, a charge control system of ejecting an ink using an electrostatic attraction force, a piezo-inkjet system of ejecting an ink using a piezoelectric element which produces mechanical strain when a voltage is applied, an acoustic inkjet system of converting electric signals into acoustic beams, radiating them to an ink, and ejecting the ink using a radiation pressure, and a thermal inkjet (BUBBLEJET (registered trade mark)) system of heating an ink to form bubbles and using the resultant pressure.

Examples of the inkjet method include a system of ejecting a number of ink droplets, which is called "photo-ink", at a low concentration in a small volume, a system of improving an image quality using plural inks which have substantially identical hues and different concentrations, and a system of using a colorless transparent ink.

As the inkjet method in the present invention, a piezo-inkjet system is suitably used. By combining the ink composition used in the present invention or an ink set containing the ink composition with the piezo-inkjet system, continuous ejectability and ejection stability of the ink are further improved. In the piezo-inkjet system, the strain form of the piezoelectric element may be in any of a bending mode, a longitudinal mode, and a shear mode. The configuration of the piezoelectric element and the structure of the piezo head are not particularly limited, and any well-known technologies can be employed.

The ink nozzle and the like used when recording is performed through an inkjet method are not particularly limited, and can be appropriately selected depending on the purpose.

The inkjet method applicable to the present invention may be a shuttle system of performing recording using a short serial head while allowing the head to scan in a width direction of a recording medium. However, an embodiment in which a line system using a line head in which recording elements are arranged corresponding to the entire region for one side of a recording medium, is preferred. In the case of the line system, an image can be recorded over the entire surface of the recording medium by allowing the recording medium to be scanned in the direction (hereinafter, referred to as "sub-scanning direction" in some cases) intersecting the arrangement direction (main-scanning direction) of the recording elements.

In the present invention, the conveyance speed of 50 m/min or higher indicates that the recording medium is conveyed in a sub-scanning direction at a conveyance speed of 50 m/min or higher when applying an ink composition on a recording medium through an inkjet method. That is, the ink applying step in the present invention may be a step of applying an ink composition on a recording medium which is conveyed in a sub-scanning direction at a conveyance speed of 50 m/min or higher, through an inkjet method.

From the viewpoint of obtaining high accuracy images, the amount of droplet of the ink composition ejected from the head is preferably 0.5 pl (picoliters) to 6 pl, more preferably 1 pl to 5 pl, and even more preferably 2 pl to 4 pl.

Next, the details of the ink composition in the present invention will be described.

[Ink Composition]

The ink composition used in the ink applying step contains a pigment, a pyrrolidone derivative, a specific glycerin-based compound, and water.

The ink composition may further contain other components such as resin particles as necessary.

(Pigment)

The ink composition in the present invention contains at least one pigment.

The pigment can be appropriately selected depending on the purpose, and may be any of an organic pigment or an inorganic pigment.

Examples of the organic pigment include an azo pigment, a polycyclic pigment, a dye chelate, a nitro pigment, a nitroso pigment, and aniline black. Among these, an azo pigment, a polycyclic pigment, and the like are more preferable. Examples of the azo pigment include an azo lake, an insoluble azo pigment, a condensed azo pigment, and a chelate azo pigment. Examples of the polycyclic pigment include a phthalocyanine pigment, a perylene pigment, a perinone pigment, an anthraquinone pigment, a quinacridone pigment, a dioxazine pigment, an indigo pigment, a thioindigo pigment, an isoindolinone pigment, and a quinophthalone pigment. Examples of the dye chelate include a basic dye type chelate and an acidic dye type chelate.

Examples of the inorganic pigment include titanium oxide, iron oxide, calcium carbonate, barium sulfate, aluminum hydroxide, barium yellow, cadmium red, chrome yellow, and carbon black. Among these, carbon black is particularly preferable. Meanwhile, examples of the carbon black include those produced through well-known methods such as a contact method, a furnace method and a thermal method. Among these pigments, a water-dispersible pigment is preferable.

Specific examples of the water-dispersible pigment include pigments of the following (1) to (4).

(1) An encapsulated pigment, that is, a polymer dispersion obtained by incorporating a pigment into polymer microparticles, and more particularly, a pigment which enables a pigment to be dispersed in water by coating the pigment with a hydrophilic water-insoluble resin and hydrophilizing the resin layer of the pigment surface.

(2) A self-dispersing pigment, that is, a pigment having at least one hydrophilic group at the surface and exhibits at least any one of water-dispersibility and water-solubility in the absence of a dispersant, and more particularly, a pigment in which mainly carbon black or the like is subjected to surface oxidation and hydrophilization, and the pigment simple substance is dispersed in an aqueous medium.

(3) A resin-dispersed pigment, that is, a pigment dispersed by a water-soluble polymer compound having a weight average molecular weight of 50,000 or less.

(4) A surfactant-dispersed pigment, that is, a pigment dispersed by a surfactant.

Here, the (1) encapsulated pigment will be described in detail.

The resin of the encapsulated pigment is not limited, but is preferably a polymer compound which has self-dispersion capacity or dissolution capacity in a mixed solvent of water and a water-soluble organic solvent and has an anionic group (acidity). This resin is usually a resin having a number average molecular weight preferably in the range of 1,000 to 100,000, and particularly preferably in the range of 3,000 to 50,000. Furthermore, this resin is preferably a resin which dissolves in an organic solvent and forms a solution. If the number average molecular weight of the resin is in the range of 3,000 to 50,000, the function as a coating film for the pigment or as a coating film prepared into an ink can be exhibited. The resin is preferably used in the form of a salt of an alkali metal or an organic amine.

Specific examples of the resin of the encapsulated pigment include materials having anionic groups, including a thermoplastic, thermosetting or modified acrylic resin, an epoxy-based resin, a polyurethane-based resin, a polyether-based resin, a polyamide-based resin, an unsaturated polyester-based resin, a phenolic resin, a silicone-based resin, and a fluorine-based resin; polyvinyl-based resins such as polyvinyl chloride, polyvinyl acetate, polyvinyl alcohol, and polyvinyl butyral; polyester-based resins such as an alkyd resin and a phthalic acid resin; amino-based materials such as a melamine resin, a melamine formaldehyde resin, an amino-alkyd co-condensate resin, and a urea resin; and copolymers or mixtures thereof.

Among these resins, the anionic acrylic resin may be obtained by, for example, polymerizing an acrylic monomer having an anionic group (hereinafter, referred to as "anionic group-containing acrylic monomer") and if necessary, another monomer capable of copolymerizing with the anionic group-containing acrylic monomer in a solvent. Examples of the anionic group-containing acrylic monomer include acrylic monomers having one or more anionic groups selected from the group consisting of a carboxy group, a sulfonic acid group, and a phosphonic group, and among these, an acrylic monomer having a carboxy group is particularly preferable. Specific examples of the acrylic monomer having a carboxy group include acrylic acid, methacrylic acid, crotonic acid, ethacrylic acid, propylacrylic acid, isopropylacrylic acid, itaconic acid, and fumaric acid. Among these, acrylic acid or methacrylic acid is preferable.

The encapsulated pigment can be produced through a conventional physical or chemical method. For example, the encapsulated pigment can be produced through the methods disclosed in JP1997-151342A (JP-H9-151342A), JP1998-140065A (JP-H10-140065A), JP1999-209672A (JP-H11-209672A), JP1999-172180A (JP-H11-172180A), JP1998-25440A (JP-H10-25440A), or JP1999-43636A (JP-H11-43636A). Specific examples thereof include a reverse phase emulsification method and an acid precipitation method disclosed in JP1997-151342A (JP-H9-151342A) and JP1998-140065A (JP-H10-140065A), and among these, a reverse phase emulsification method is preferable from the viewpoint of dispersion stability. The reverse phase emulsification method will be described below.

In addition, the self-dispersing pigment is one preferred example. The self-dispersing pigment is a pigment capable of dispersing in an aqueous medium without using a dispersant for pigment dispersion, by having plural hydrophilic functional groups and/or salts thereof (hereinafter, referred to as "dispersibility imparting groups") bonded to the pigment surface directly or indirectly through an alkyl group, an alkyl ether group, an aryl group, or the like. Here, the phrase "dispersing in an aqueous medium without using a dispersant" implies that the pigment can be dispersed in an aqueous medium even if a dispersant for dispersing a pigment is not used.

In general, it is unnecessary for an ink containing the self-dispersing pigment as a colorant to contain a dispersant which is incorporated in order to disperse a pigment, and therefore, an ink which hardly exhibits foaming caused by a decrease in defoamability attributable to the dispersant and has excellent ejection stability can be easily prepared. Examples of the dispersibility imparting group that is bonded to the surface of the self-dispersing pigment include —COOH, —CO, —OH, —SO$_3$H, —PO$_3$H$_2$, quaternary ammonium, and salts thereof. The dispersibility imparting group is bonded by subjecting a pigment to a physical treatment or a chemical treatment, and bonding (grafting) a dispersibility imparting group or an active species having a dispersibility imparting group to the pigment surface. Examples of the physical treatment include a vacuum plasma treatment. Furthermore, examples of the chemical treatment include a wet oxidation method of oxidizing the pigment surface in water using an oxidizing agent, and a method of bonding p-aminobenzoic acid to the pigment surface and thereby bonding a carboxy group via a phenyl group.

In the present invention, for example, a self-dispersing pigment which is surface treated by an oxidation treatment using hypohalous acid and/or a hypohalite, or an oxidation treatment using ozone can be exemplified as a preferred example. In regard to the self-dispersing pigment, a commercially available product may be used, and specifically, MICROJET CW-1 (product name; manufactured by Orient Chemical Industries Co., Ltd.), CAB-O-JET200, and CAB-O-JET300 (product name; manufactured by Cabot Corp.).

The pigment is preferably an encapsulated pigment in which at least a portion of the pigment surface is coated with a water-insoluble resin using a water-insoluble resin in a pigment dispersant, for example, a polymer emulsion in which a pigment is incorporated in water-insoluble resin particles, and more specifically, a water-dispersible pigment in which at least a portion of the pigment is coated with a water-insoluble resin, and a resin layer is formed at the pigment surface so that the pigment can be dispersed in water, is preferable. Use of these encapsulated pigments coated with water-insoluble resins is preferable from the viewpoint of the aggregatability of the pigment, and in the case of performing high speed recording, it is preferable from the viewpoint of being capable of forming images with high resolution.

Here, the reverse phase emulsification method will be described.

The reverse phase emulsification method is in principle a self-dispersing (reverse phase emulsification) method of dispersing a mixed molten product of a resin having a self-dispersing capacity or dissolution capacity and a pigment in water. Furthermore, this mixed molten product may also include a polymer compound or a curing agent. Here, the mixed molten product refers to a product including any of a state of being mixed without being dissolved, a state of being dissolved and mixed, or both the states. A more specific production method of the "reverse phase emulsification method" may be a method disclosed in JP1998-140065A (JP-H10-140065A).

In regard to more specific methods of the reverse phase emulsification method and the acid precipitation method, reference can be made to the disclosures of JP1997-151342A (JP-H9-151342A) and JP1998-140065A (JP-H10-140065A).

—Pigment Dispersant—

A pigment dispersant can promote easy dispersion when the pigment is dispersed, and dispersion stabilization after dispersion. Examples of the pigment dispersant include a nonionic compound, an anionic compound, a cationic compound, and an amphoteric compound. For example, a copolymer of a monomer having an α,β-ethylenically unsaturated group may be used. Examples of the monomer having an α,β-ethylenically unsaturated group include ethylene, propylene, butene, pentene, hexene, vinyl acetate, allyl acetate, acrylic acid, methacrylic acid, crotonic acid, crotonic acid ester, itaconic acid, itaconic acid monoester, maleic acid, maleic acid monoester, maleic acid diester, fumaric acid, fumaric acid monoester, vinylsulfonic acid, styrenesulfonic acid, sulfonated vinylnaphthalene, vinyl alcohol, acrylamide, methacryloxyethyl phosphate, bismethacryloxyethyl phosphate, methacryloxyethylphenyl acid phosphate, ethylene glycol dimethacrylate, diethylene glycol dimethacrylate; styrene derivatives such as styrene, α-methylstyrene, and vinyltoluene; vinylcyclohexane, vinylnaphthalene, vinylnaphthalene derivatives, acrylic acid alkyl ester which may be substituted with aromatic groups, acrylic acid phenyl ester, methacrylic acid alkyl ester which may be substituted with an aromatic group, methacrylic acid phenyl ester, methacrylic acid cycloalkyl ester, crotonic acid alkyl ester, itaconic acid dialkyl ester, maleic acid dialkyl ester, and derivatives of the compounds.

A copolymer which can be obtained by copolymerizing a single monomer or a plurality of the monomers having an α,β-ethylenically unsaturated group can be used as a polymeric dispersant. Specific examples thereof include an acrylic acid alkyl ester-acrylic acid copolymer, a methacrylic acid alkyl ester-methacrylic acid copolymer, a styrene-acrylic acid alkyl ester-acrylic acid copolymer, a styrene-methacrylic acid phenyl ester-methacrylic acid, a styrene-methacrylic acid cyclohexyl ester-methacrylic acid copolymer, a styrene-styrenesulfonic acid copolymer, a styrene-maleic acid copolymer, a styrene-methacrylic acid copolymer, a styrene-acrylic acid copolymer, a vinylnaphthalene-maleic acid copolymer, a vinylnaphthalene-methacrylic acid copolymer, a vinylnaphthalene-acrylic acid copolymer, polystyrene, polyester, and polyvinyl alcohol.

The weight average molecular weight of the pigment dispersant is preferably 2,000 to 60,000.

The amount of the pigment dispersant added to the pigment is preferably, on a mass basis, in the range of 10% to 100% of the pigment, more preferably 20% to 70% of the pigment, and even more preferably 40% to 50% of the pigment.

In addition, the pigment in the present invention is preferably a resin-coated pigment in which at least a portion of the pigment surface is coated with a crosslinked polymer obtained by crosslinking a water-soluble resin with a crosslinking agent. The water-soluble resin acts as a dispersant for dispersing the pigment. Since the pigment is coated with a crosslinked polymer, when the pigment is prepared into a pigment dispersion or into an ink composition using the pigment dispersion, excellent stability (stability against pH fluctuation and stability against temperature fluctuation) can be imparted.

Examples of the water-soluble resin include polyvinyls, polyurethanes, and polyesters, and among these, polyvinyls are preferable.

The water-soluble resin has a group which causes a crosslinking reaction caused by a crosslinking agent in the molecule. Such a group is not particularly limited, but examples thereof include a carboxy group or a salt thereof, an isocyanate group, and an epoxy group. According to the present invention, from the viewpoint of enhancing dispersibility, a water-soluble resin having a carboxy group or a salt thereof is preferable.

The water-soluble resin that can be used in the present invention is preferably a copolymer obtainable using a carboxy group-containing monomer as a copolymerization component. Examples of the carboxy group-containing monomer include methacrylic acid, β-carboxyethyl acrylate, fumaric acid, itaconic acid, maleic acid, and crotonic acid, and among these, from the viewpoints of crosslinkability and dispersion stability, methacrylic acid or β-carboxyethyl acrylate is preferable.

Furthermore, in addition to the carboxy group-containing monomer, an arbitrarily selected hydrophilic monomer or hydrophobic monomer may also be used as a copolymerization component. The hydrophilic monomer may be ionic or nonionic. The hydrophobic monomer is not particularly limited, but an alkyl methacrylate having 1 to 20 carbon atoms or an alkyl acrylate having 1 to 20 carbon atoms is preferable.

The water-soluble resin may be a random polymer, or any of a block polymer or a graft polymer.

The acid value of the water-soluble resin (number of milligrams of KOH required to neutralize 1 g of the water-soluble resin) is preferably 135 mgKOH/g to 250 mgKOH/g, more preferably 135 mgKOH/g to 200 mgKOH/g, and particularly preferably 135 mgKOH/g to 180 mgKOH/g, from the viewpoints of the dispersibility of the pigment and the dispersion stability.

The synthesis method of a polymer as a water-soluble resin is not particularly limited, but random polymerization of a vinyl monomer is preferable from the viewpoint of dispersion stability.

In regard to the crosslinking agent, compounds having two or more sites that cause a crosslinking reaction can be used, and among these, from the viewpoint of having excellent reactivity with a carboxy group, a bifunctional or higher-functional epoxy compound is preferable. Specific examples of the bifunctional or higher-functional epoxy compound include ethylene glycol diglycidyl ether, polyethylene glycol diglycidyl ether, 1,6-hexanediol diglycidyl ether, diethylene glycol diglycidyl ether, polyethylene glycol diglycidyl ether, dipropylene glycol diglycidyl ether, and polypropylene glycol diglycidyl ether. Polyethylene glycol diglycidyl ether or diethylene glycol diglycidyl ether is preferable.

The molar ratio of the crosslinking site of the crosslinking agent to the crosslinking site of the water-soluble resin is, from the viewpoints of the crosslinking reaction rate and the stability of the dispersion liquid after crosslinking, preferably 1:1.1 to 1:10, more preferably 1:1.1 to 1:5, and most preferably 1:1.1 to 1:3.

The amount of the water-soluble resin with respect to the pigment is preferably 10 mass % to 250 mass %, more preferably 10 mass % to 200 mass %, even more preferably 20 mass % to 150 mass %, and particularly preferably 30 mass % to 100 mass %.

A resin-coated pigment, in which the pigment surface is coated with a crosslinked polymer obtained by crosslinking a water-soluble resin with a crosslinking agent, can be obtained through a process of dispersing a pigment using a water-soluble resin, and then, crosslinking the water-soluble resin with a crosslinking agent. A preferred example of the preparation method includes a method of carrying out the following steps (1) to (3):

(1) A dispersion step of dispersing a pigment and a water-soluble resin in water or an aqueous solution of a polar solvent, and obtaining a pigment dispersion liquid;

(2) A crosslinking step of heating the pigment dispersion liquid obtained in the step (1) with an added crosslinking agent, and performing a crosslinking reaction to coat the pigment surface with a crosslinked polymer; and (3) A step of purifying the resin-coated pigment coated with a crosslinked polymer.

In addition to these steps, other steps may also be appropriately provided as necessary. In the step (1), in regard to the polar solvent and the like, any known agents can be appropriately used.

In regard to the pigment, one kind may be used alone, or plural kinds can be selected from within each group or among various groups and used in combination.

The content of the pigment in the ink composition is, from the viewpoints of color density, particulate properties, ink stability, and ejection reliability, preferably an amount of 0.1 mass % to 15 mass %, more preferably an amount of 0.5 mass % to 12 mass %, and particularly preferably 1 mass % to 10 mass %, relative to the total mass of the ink composition.

(Pyrrolidone Derivative)

The ink composition in the present invention preferably contains at least one pyrrolidone derivative. When a pyrrolidone derivative is further incorporated in the ink composition containing a specific glycerin-based compound to be described later, abrasion resistance of the image is improved while preventing the strike through of an ink, and when multiple sheets of images are processed at a high speed, abrasion failure such as a scratch on the image can be prevented.

In regard to the pyrrolidone derivative in the present invention, any compound having a lactam structure of 5-membered ring can be used without limitations. A lactam structure is a structure containing —CO—NR— in a portion of the ring, and R in the structure represents a monovalent group.

Examples of the monovalent group include a hydrogen atom, an alkyl group, an aryl group, and alkenyl group.

Among these, the monovalent group is preferably a hydrogen atom or an alkyl group, and particularly preferably a hydrogen atom.

The alkyl group, aryl group, and alkenyl group may have a substituent or may not have a substituent. However, these groups preferably do not have a substituent.

When R in CO—NR— is an alkyl group, the number of carbon atoms of the alkyl group is preferably 1 to 10, more preferably 1 to 6, and particularly preferably 1 to 4. The alkyl group may have a linear structure, a branched structure, or a cyclic structure. Specific examples of the alkyl group include a methyl group, an ethyl group, a propyl group, an isopropyl group, a butyl group, an isobutyl group, a sec-butyl group, a tert-butyl group, a pentyl group, an isopentyl group, a neopentyl group, an octyl group, a nonyl group, a decyl group, a cyclopropyl group, a cyclobutyl group, a cyclopentyl group, a cyclohexyl group, a cycloheptyl group, and a cyclooctyl group.

Examples of the substituent in the case where the alkyl group has a substituent include an alkoxy group having 1 to 8 carbon atoms, an aryl group having 6 to 14 carbon atoms, a hydroxyl group, a carboxy group, and a halogen atom (a fluorine atom, a chlorine atom, an iodine atom, or the like).

When R in CO—NR— is an aryl group, the number of carbon atoms of the aryl group is preferably 6 to 20, more preferably 6 to 14, and particularly preferably 6 to 10. Specific examples of the aryl group include a phenyl group, a naphthyl group, and an anthryl group.

Examples of the substituent when the aryl group has a substituent include an alkoxy group having 1 to 8 carbon atoms, an alkyl group having 1 to 10 carbon atoms, a hydroxyl group, a carboxy group, and a halogen atom (a fluorine atom, a chlorine atom, an iodine atom, or the like).

When R in CO—NR— is an alkenyl group, the number of carbon atoms of the alkenyl group is preferably 2 to 10, more preferably 2 to 6, and particularly preferably 2 to 4. The alkenyl group may have a linear structure, a branched structure, or a cyclic structure. Specific examples of the alkenyl group include an ethenyl group, a 1-propenyl group, a 2-propenyl group, a 2-methyl-1-propenyl group, a 1-butenyl group, a 2-butenyl group, a 3-butenyl group, a 3-methyl-2-butenyl group, a 1-pentenyl group, a 2-pentenyl group, a 3-pentenyl group, a 4-pentenyl group, a 4-methyl-3-pentenyl group, a 1-hexenyl group, a 3-hexenyl group, a 5-hexenyl group, a 1-heptenyl group, and a 1-octenyl group.

Examples of the substituent when the alkenyl group has a substituent include an alkoxy group having 1 to 8 carbon atoms, an aryl group having 6 to 14 carbon atoms, a hydroxyl group, a carboxy group, and a halogen atom (a fluorine atom, a chlorine atom, an iodine atom or the like).

The pyrrolidone derivative is preferably a compound represented by the following general formula (P-1).

[Chem. 13]

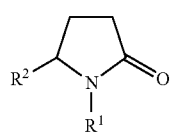

(P-1)

In the general formula (P-1), $R^1$ represents a hydrogen atom, an alkyl group, an aryl group or an alkenyl group. The alkyl group, aryl group and alkenyl group represented by $R^1$ have the same meanings as those of the alkyl group, aryl group and alkenyl group represented by R in the "structure containing —CO—NR—" described above, and preferred embodiments also have the same meanings.

$R^2$ in the general formula (P-1) represents a hydrogen atom or an alkyl group. The alkyl group represented by $R^2$ preferably has 1 to 10 carbon atoms, and may have any of a linear structure, a branched structure, and a cyclic structure. Specific examples of the alkyl group include the same examples of the alkyl group represented by R in the "structure containing —CO—NR—".

$R^2$ in the general formula (P-1) is preferably a hydrogen atom or an alkyl group having 1 to 4 carbon atoms, and particularly preferably a hydrogen atom.

Among the compounds represented by the general formula (P-1), in particular, an embodiment in which $R^1$ is a hydrogen atom or an alkyl group having 1 to 4 carbon atoms, and $R^2$ is a hydrogen atom or an alkyl group having 1 to 4 carbon atoms is preferred, and an embodiment in which $R^1$ and $R^2$ are together hydrogen atoms is particularly preferred.

Examples of the pyrrolidone derivative in the present invention include 2-pyrrolidone, N-methyl-2-pyrrolidone, N-ethyl-2-pyrrolidone, N-butyl-2-pyrrolidone, N-vinyl-2-pyrrolidone, 5-methyl-2-pyrrolidone, N-phenyl-2-pyrrolidone, N-cyclohexyl-2-pyrrolidone, and N-hydroxyethyl-2-pyrrolidone. Among these, from the viewpoint of increasing the scratch resistance of an image, 2-pyrrolidone, N-methyl-2-pyrrolidone and N-ethyl-2-pyrrolidone are preferable, 2-pyrrolidone and N-methyl-2-pyrrolidone are more preferable, and 2-pyrrolidone is particularly preferable.

The content of the pyrrolidone derivative in the ink composition in the present invention is preferably 3.0 mass % to 20.0 mass %, more preferably 5 mass % to 16 mass %, and particularly preferably 6 mass % to 15 mass %, relative to the total mass of the ink composition.

When the content of the pyrrolidone derivative is 3.0 mass % or greater, scratch resistance of the image can be further improved. In addition, when the content of the pyrrolidone derivative is 20.0 mass % or less, it is advantageous to maintain the ink composition stably.

In the present invention, the content ratio (p/s; mass ratio) of the pyrrolidone derivative (p) to the specific glycerin-based compound (s) to be described later is preferably 0.075 to 4.0. When the content ratio p/s is 0.075 or higher, the scratch resistance of the image can be further improved. In addition, when the content ratio p/s is 4.0 or less, the effect of preventing the strike through phenomenon occurring when the ink composition applied on a recording medium penetrates into the back surface of the recording medium is high, and it is advantageous in suppressing curling.

For the same reasons, the content ratio p/s is more preferably in the range of 0.09 to 3.5, and particularly preferably in the range of 0.11 to 3.2.

(Compound Represented by General Formula (II))

The ink composition in the present invention contains at least one compound (specific glycerin-based compound) represented by the general formula (II).

The specific glycerin-based compound is an alkylene oxide adduct of glycerin represented by the general formula (II). When the specific glycerin-based compound is incorporated into the ink composition, penetration of the ink into a recording medium can be suppressed to the extent that abrasion resistance of the image is not significantly impaired.

[Chem. 14]

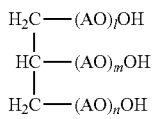

General Formula (II)

In the general formula (II), l, m and n each independently represent an integer of 1 or greater, and satisfy the relation l+m+n=3 to 15. When the value of l+m+n is 3 or greater, the curl suppressing effect is satisfactory, and when the value is 15 or less, satisfactory ink ejection properties can be maintained. Among the values, the value of l+m+n is preferably in the range of 3 to 12, and more preferably in the range of 3 to 10. AO in the general formula (II) represents ethyleneoxy (may be abbreviated to EO) and/or propyleneoxy (may be abbreviated to PO), and among these, a propyleneoxy group is preferable. AOs in $(AO)_l$, $(AO)_m$, and $(AO)_n$ may be identical to or different from each other.

Examples of the specific glycerin-based compound will be shown below. Meanwhile, the values within the parentheses are SP values (solubility parameter/unit: $(cal/cm^3)^{1/2}$). However, in the present invention, the compound is not limited thereto.

[Chem. 15]

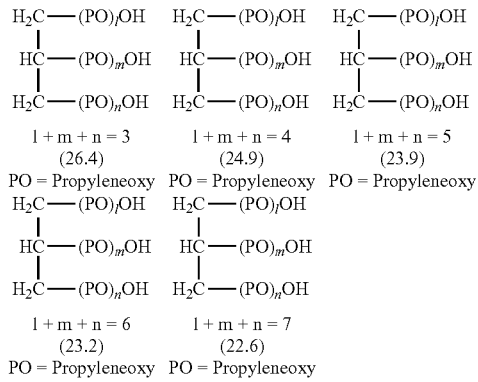

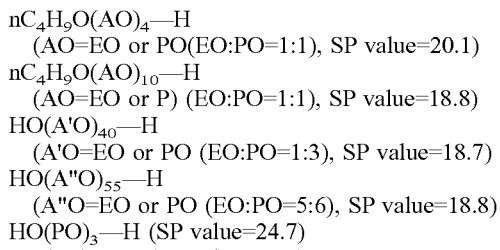

$nC_4H_9O(AO)_4$—H
(AO=EO or PO(EO:PO=1:1), SP value=20.1)
$nC_4H_9O(AO)_{10}$—H
(AO=EO or P) (EO:PO=1:1), SP value=18.8)
$HO(A'O)_{40}$—H
(A'O=EO or PO (EO:PO=1:3), SP value=18.7)
$HO(A''O)_{55}$—H
(A''O=EO or PO (EO:PO=5:6), SP value=18.8)
$HO(PO)_3$—H (SP value=24.7)
$HO(PO)_7$—H (SP value=21.2)
1,2-hexanediol (SP value=27.4)
EO and PO represent an ethyleneoxy group and a propyleneoxy group, respectively.

In regard to the alkylene oxide adduct of glycerin, a commercially available product that is being marketed may be used. Examples of polyoxypropylated glycerin (ether of polypropylene glycol and glycerin) include SANNIX GP-250 (average molecular weight 250), SANNIX GP-400 (average molecular weight 400), and SANNIX GP-600 (average molecular weight 600) [all are manufactured by Sanyo Chemical Industries, Ltd.]; LEOCON GP-250 (average molecular weight 250), LEOCON GP-300 (average molecular weight 300), LEOCON GP-400 (average molecular weight 400), LEOCON GP-700 (average molecular weight 700) [all are manufactured by Lion Corp.]; and a polypropylene triol glycol-triol type (average molecular weight 300, average molecular weight 700) [all are manufactured by Wako Pure Chemical Industries, Ltd.].

The SP value is a value represented by square root of molecular aggregation energy, and is calculated by the method disclosed in R. F. Fedors, Polymer Engineering Science, 14, p. 147-154 (1974).

The SP value is preferably in the range of 27.5 or less.

Furthermore, the ink composition may further contain another water-soluble organic solvent in addition to the specific glycerin-based compound. In this case, it is preferable that the SP value in 70 mass % or greater of the total amount of the specific glycerin-based compound and the other water-soluble organic solvent included in the ink composition be 27.5 or less. When the SP value is 27.5 or less, the occurrence of curling in various environmental humidity values after image formation is further suppressed. In addition, when the ink composition contains the resin particles which will be described below, the organic solvent and the resin particles interact, and fixability is improved. Particularly, when components having relatively lower SP values (≤27.5) are included in a large amount, scratch resistance of the image can be further improved. In addition, it is also effective in suppressing offset.

The content of the specific glycerin-based compound is preferably 5.0 mass % to 40.0 mass %, more preferably 7.0 mass % to 35.0 mass %, and particularly preferably 8.0 mass % to 30.0 mass %, relative to the total mass of the ink composition.

When the content of the specific glycerin-based compound is 5.0 mass % or greater, the penetrability of the ink composition to the recording medium is alleviated, and strike through of the ink is also prevented.

Examples of the other water-soluble organic solvent include the water-soluble organic solvents disclosed in paragraphs 0036 to 0039 of JP2009-190379A, and the other water-soluble organic solvent may be appropriately selected from these and used.

(Resin Particles)

It is preferable that the ink composition in the present invention further contain at least one kind of resin particles. When the ink composition contains resin particles, scratch resistance of the image can be further improved by performing a heat treatment after image formation.

The resin particles are preferably self-dispersing resin particles having a hydrophilic constituent unit (repeating unit derived from a hydrophilic monomer) and a hydrophobic constituent unit (repeating unit derived from a hydrophobic monomer). It is more preferable that the ink composition contain self-dispersing resin particles which contain a hydrophilic constituent unit and a hydrophobic constituent unit and have a glass transition temperature (Tg) of 80° C. or higher, from the viewpoint of further enhancing the scratch resistance of the image. Tg being 80° C. or higher means that the resin particles are hydrophobic. When Tg of the resin particles contained is 80° C. or higher, the fixability of the ink composition to a recording medium and the abrasion resistance of an image are improved.

In addition, Tg of the resin particles is more preferably 100° C. to 300° C., even more preferably 130° C. to 250° C., and particularly preferably 160° C. to 200° C. When the glass transition temperature of the resin particles is 300° C. or lower, the abrasion resistance of recorded images is more effectively improved.

Tg is a value measured under conventional measurement conditions using a differential scanning calorimeter (DSC) EXSTAR6220 (manufactured by SII Nanotechnology, Inc.). However, if measurement is difficult due to decomposition of the resin or the like, a calculation Tg that is calculated by the following calculation formula is applied. The calculation Tg is calculated by the following formula (1):

$$1/Tg = \Sigma(X_i/Tg_i) \quad (1)$$

Here, the polymer which is to be calculated is considered to have n kinds of monomer components of i=1 to n being copolymerized. $X_i$ represents a mass fraction ($\Sigma X_i$=1) of the i-th monomer, and $Tg_i$ represents a glass transition temperature (absolute temperature) of a homopolymer of the i-th monomer. However, $\Sigma$ means the sum of i=1 to n. Furthermore, for the value ($Tg_i$) of the glass transition temperature of a homopolymer of each monomer, the values described in Polymer Handbook (3rd Edition) (by J. Brandrup and E. H. Immergut (Wiley InterScience, 1989)) are employed.

Examples of the resin particles include latexes of an acrylic resin, a vinyl acetate-based resin, a styrene-butadiene-based resin, a vinyl chloride-based resin, an acrylic-styrene-based resin, a butadiene-based resin, a styrene-based resin, a crosslinked acrylic resin, a crosslinked styrene-based resin, a benzoguanamine resin, a phenolic resin, a silicone resin, an epoxy resin, a urethane-based resin, a paraffin-based resin, and a fluorine-based resin. Among these, preferred examples include particles of an acrylic resin, an acrylic-styrene-based resin, a styrene-based resin, a crosslinked acrylic resin, and a crosslinked styrene-based resin.

The weight average molecular weight of the resin particles is preferably 10,000 to 200,000, and more preferably 100,000 to 200,000, from the viewpoint of the stability of the ink composition.

The average particle size of the resin particles is preferably in the range of 10 nm to 1 μm, more preferably 10 nm to 200 nm, even more preferably 20 nm to 100 nm, and particularly preferably 20 nm to 50 nm.

The resin particles can be used in a dispersed state such as latex.

When the ink composition contains resin particles, the content of the resin particles in the ink composition is preferably 0.5 mass % to 20 mass %, more preferably 3 mass % to 20 mass %, and even more preferably 5 mass % to 15 mass %, relative to the total mass of the ink composition from the viewpoints of fixability, abrasion resistance, and the viscosity of the ink composition.

(Water)

The ink composition in the present invention contains water, but the amount of water is not particularly limited. Above all, the amount of water is preferably from 10 mass % to 99 mass %, more preferably from 20 mass % to 80 mass %, even more preferably 30 mass % to 70 mass %, and particularly preferably 40 mass % to 60 mass %, relative to the total mass of the ink composition from the viewpoints of securing stability and ejection reliability.

Water is preferably water from which ionic impurities have been removed as much as possible, for example, pure water or ultrapure water such as ion-exchanged water, ultrafiltration water, reverse osmosis water, or distilled water. In addition, when the pigment dispersion liquid and the ink composition using the dispersion liquid are stored for a long period of time, use of water that has been sterilized through ultraviolet irradiation or addition of hydrogen peroxide is suitable in view of preventing the occurrence of fungi or bacteria.

(Other Components)

The ink composition in the present invention may further contain additives such as penetrating solvents, moisture retaining agents, preservatives, antifungal agents, pH adjusting agents, and chelating agents, as other components as necessary. Regarding the details of these additives, reference can be made to the disclosures of paragraphs 0067 to 0076 of JP2010-90266A.

—Drying Step—

The image forming method of the present invention may also be provided with a drying step of drying the ink applied in the ink applying step. Through the drying, the liquid medium, specifically, water, a pyrrolidone derivative, or another water-soluble organic solvent, contained in the ink composition applied on a recording medium evaporates and scatters, and a colored resin coating film is formed. Accordingly, high quality images with fewer image defects such as scratches or peeling off can be formed at a high speed on a recording medium.

Heating and drying can be performed by well-known heating means such as a heater; air blowing means, such as a dryer, using air blowing; or combined means thereof. Examples of the heating method include a method of applying heat to the ink-applied surface of a recording medium, and to an opposite surface using a heater or the like (specifically, for example, a method of blowing warm air against the ink-applied surface, and heating the surface opposite to the ink-applied surface with a heater drum); a method of blowing warm air or hot air against the ink-applied surface of a recording medium; and a heating method using an infrared heater. Heating may also be performed by combining plural methods thereof as the heating method.

The temperature at the time of heating and drying is not particularly limited, and any temperature range capable of drying may be selected. For example, a form of heating through air blowing so that the temperature of the recording medium becomes 40° C. to 80° C., or a form of drying by bringing the recording medium into contact with a drying drum at 50° C. to 110° C. so that the temperature of the recording medium becomes 40° C. to 80° C., may be used. In addition, drying may also be performed by using these in combination.

—Cooling Step—

The image forming method of the present invention may also be provided with a cooling step of cooling the recording medium, after first heating and drying the recording medium in the drying step.

Any method may be used as the cooling step as long as a cooling step can actively lower the temperature of the recording medium. Examples of the cooling method include a method of passing the recording medium through a cooling zone, a method of blowing cold air against the recording medium, and a method of bringing the recording medium into contact with a cooled object.

—Heating and Fixing Step—

The image forming method of the present invention may be further provided, if necessary, with a heating and fixing step of heating the ink composition on the recording medium after the ink applying step and fixing the ink composition thereto. In the heating and fixing step, an image formed by applying the ink composition is heated and then fixed to the recording medium (heating and fixing treatment). Through the heating and fixing treatment, the image on the recording medium is subjected to fixing, and abrasion resistance of the image can be further improved.

The heating is preferably performed, for example, at a temperature higher than or equal to the minimum film-forming temperature (MFT) of the resin particles in the image. When the ink composition is heated to a temperature higher than or equal to the MFT, the particles form a film coating, and the image is reinforced. Pressing may also be performed together with heating. When heating is performed under pressure, the pressure at the time of pressing is preferably in the range of 0.1 MPa to 3.0 MPa, from the viewpoint of surface smoothing.

The heating method is not particularly limited, but suitable examples thereof include methods of drying the recording medium in a non-contact manner, such as a method of heating with a heat generator such as a nichrome wire heater; a method of supplying warm air or hot air; and a method of heating with a halogen lamp, an infrared lamp, or the like. In addition, the method of heating and pressing is not particularly limited, but suitable examples thereof include methods of carrying out heating and fixing the ink composition in a contact manner, such as a method of pressing a hot plate on the image-formed surface of the recording medium, or a method of using a heating pressing apparatus equipped with a pair of heating pressing rollers, a pair of heating pressing belts, or a heating pressing belt disposed on the image-recorded surface of the recording medium and a retaining roller disposed on the opposite side, and passing the recording medium between the rollers forming a pair.

<<Ink Set>>

The above-described treatment liquid and the above-described ink composition may be combined together and set to an ink set.

That is, the ink set of the present invention includes a treatment liquid which contains an organic acidic compound represented by the general formula (I), a water-soluble polymer compound, and water, and an ink composition which contains a pigment, pyrrolidone derivative, a compound represented by the general formula (II), and water.

It is possible to obtain an image which has excellent abrasion resistance and high resolution by performing image formation using the ink set of the present invention.

The details of the treatment liquid and the ink composition included in the ink set, and a preferred embodiment thereof are the same as the details of the treatment liquid and the ink composition used in the image forming method of the present invention, and the preferred embodiment thereof.

EXAMPLES

Hereinafter, the present invention will be described more specifically based on Examples. However, the scope of the present invention is not limited to the following specific examples. Unless particularly stated otherwise, the units "parts", "%", and "ppm" are on a mass basis.

The weight average molecular weight was measured through gel permeation chromatography (GPC). Unless particularly stated otherwise, HLC-8020GPC (manufactured by Tosoh Corporation) was used as the GPC, three TSKgel Super Multipore HZ-H columns (manufactured by Tosoh Corporation, 4.6 mmID×15 cm) were used as columns, and tetrahydrofuran (THF) was used as an eluant. In addition, the measurement was performed under the conditions including the sample concentration of 0.45 mass %, the flow rate of 0.35 ml/min, the sample implantation amount of 10 µl, and the measurement temperature of 40° C. using an IR detector. In addition, calibration curves were prepared from 8 samples of "standard samples, TSK standard, polystyrene": "F-40", "F-20", "F-4", "F-1", "A-5000", "A-2500", "A-1000", and "n-propylbenzene" manufactured by Tosoh Corporation.

Example 1

Preparation of Water-Soluble Polymer Compound (Water-Soluble Polymer)

A water-soluble polymer compound (water-soluble polymer 1) used as a component in the treatment liquid was prepared as follows.

(Synthesis of Water-Soluble Polymer 1)

The structure of the water-soluble polymer 1 is shown below.

In the water-soluble polymer 1 shown below, the numeral on a lower right side of each constituent unit represents a mass ratio (mass %) and Mw represents a weight average molecular weight. The same principle applies to the following structural formulas of respective polymers.

[Chem. 16]

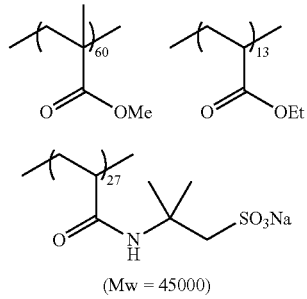

Water-soluble polymer 1

(Mw = 45000)

The water-soluble polymer 1 was synthesized as the follows.

30.0 g of isopropyl alcohol was put into a 200 mL three-neck flask equipped with a stirrer, a thermometer, a reflux cooling pipe, and a nitrogen gas introduction pipe, and the temperature of the flask was raised up to 65° C. in a nitrogen atmosphere.

Next, methyl methacrylate (hereinafter, also referred to as "MMA") (30.0 g), ethyl acrylate (hereinafter, also referred to as "EA") (6.5 g), acrylamido-2-methylpropane sulfonic acid (hereinafter, also referred to as "AMPS") (13.5 g), isopropyl alcohol (30 g), water (15 g), and "V-601" (polymerization initiator manufactured by Wako Pure Chemical Industries, Ltd.) (2.97 g (0.0129 moles); 3 mol % with respect to the total molar number (0.430 moles) of a monomer) were added dropwise at a constant speed such that the dripping was completed within two hours.

After the completion of the dripping, the mixture was stirred for 2 hours. Then, "V-601" (1.5 mol % (1.48 g) with respect to the total molar number of the monomer) and isopropyl alcohol (3.0 g) were added thereto, and the mixture was stirred for 2 hours.

The obtained polymer solution was neutralized using an aqueous solution of sodium hydroxide having the same molar number as that of acrylamido-2-methylpropane sulfonic acid used above, isopropyl alcohol was distilled off through vacuum concentration, water was added thereto such that the total amount of the polymer solution became 310 g, and a polymer aqueous solution containing 16 mass % of the water-soluble polymer 1 was obtained.

The weight average molecular weight (Mw) of the obtained water-soluble polymer 1 was 45000 (which was calculated through gel permeation chromatography (GPC) in terms of polystyrene, and the used column was TSKgel Super HZM-H, TSKgel Super HZ4000, and TSKgel Super HZ200 (manufactured by Tosoh Corporation)).

[Synthesis of Polymer Dispersant P-1]

A polymer dispersant P-1 was synthesized as follows in accordance with the following scheme.

[Chem. 17]

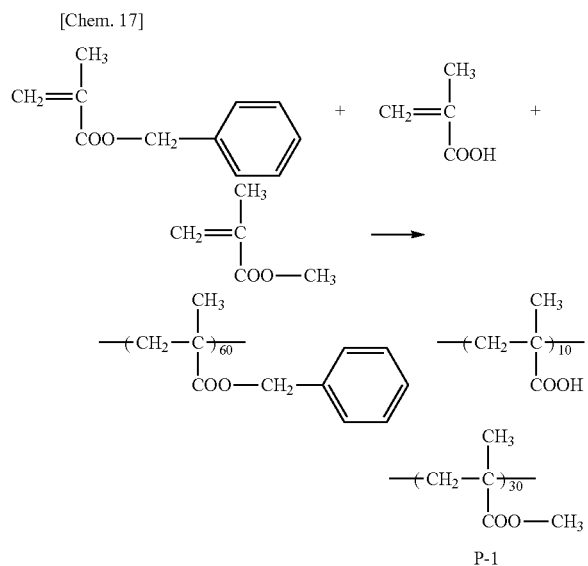

P-1

88 g of methyl ethyl ketone was added to a 1000 mL three-neck flask equipped with a stirrer and a cooling pipe which was then heated to 72° C. in a nitrogen atmosphere. A solution, in which 0.85 g of dimethyl 2,2'-azobisisobutyrate, 60 g of benzyl methacrylate, 10 g of methacrylic acid, and 30 g of methyl methacrylate were dissolved in the methyl ethyl ketone 50 g, was added dropwise to the flask for 3 hours. After the completion of the dripping, the mixture was allowed to further react for an hour, and then, a solution, in which 0.42 g of dimethyl 2,2'-azobisisobutyrate was dissolved in 2 g of methyl ethyl ketone, was added to the reacted mixture, which was then heated for 4 hours by raising the temperature of the mixture to 78° C. The obtained reaction solution was twice subjected to reprecipitation in a large excess amount of hexane, the precipitated resin was dried, and 96 g of a polymer dispersant P-1 was obtained. The numeral of each constituent unit of the polymer dispersant P-1 represents a mass ratio.

The composition of the obtained resin was checked through $^1$H-NMR and the weight average molecular weight (Mw) obtained through the GPC was 44,600. Furthermore, the acid value was obtained through the method disclosed in the JIS standard (JISK0070: 1992), which was 65.2 mgKOH/g.

[Preparation of Pigment Dispersion Liquid]
(Preparation of Cyan Dispersion Liquid)

10 parts of Pigment Blue 15:3 (Phthalocyanine Blue A220, manufactured by Dainichiseika Color & Chemicals Mfg. Co., Ltd.) which is a cyan pigment, 5 parts of a polymer dispersant P-1, 42 parts of methyl ethyl ketone, 5.5 parts of an 1 N NaOH aqueous solution, and 87.2 parts of ion-exchanged water were mixed together, and the mixture was dispersed for 2 hours to 6 hours by a bead mill using zirconia beads having a diameter of 0.1 mmφ.

Methyl ethyl ketone was removed from the obtained dispersion at 55° C. under reduced pressure, and a portion of water was further removed therefrom. Then, a dispersion which was obtained at 8000 rpm using a 50 mL centrifugal pipe was further subjected to centrifugal treatment for 30 minutes using a high-speed centrifugal cooler 7550 (manufactured by Kubota Corporation) to collect a supernatant liquid except for the precipitate. Then, a pigment concentration was obtained from an absorbance spectrum, and a dispersion (cyan dispersion liquid C) of resin coating pigment particles (pigments coated with a polymer dispersant) having a pigment concentration of 10.2 mass % was obtained. The average particle size of the obtained cyan dispersion liquid C was 105 nm.

(Preparation of Magenta Dispersion liquid)

A dispersion (magenta dispersion liquid M) of resin coating pigment particles (pigments coated with a polymer dispersant) was prepared in the same manner as in the preparation of the cyan dispersion liquid except that Pigment Red 122 which is a magenta pigment was used instead of the Pigment Blue 15:3 (Phthalocyanine Blue A220, manufactured by Dainichiseika Color & Chemicals Mfg. Co., Ltd.) in the preparation of the cyan dispersion liquid. The average particle size of the obtained magenta dispersion liquid M was 85 nm.

(Preparation of Yellow Dispersion Liquid)

A dispersion (yellow dispersion liquid Y) of resin coating pigment particles (pigments coated with a polymer dispersant) was prepared in the same manner as in the preparation of the cyan dispersion liquid except that Pigment Yellow 74 which is a yellow pigment was used instead of the Pigment Blue 15:3 (Phthalocyanine Blue A220, manufactured by Dainichiseika Color & Chemicals Mfg. Co., Ltd.) in the preparation of the cyan dispersion liquid. The average particle size of the obtained yellow dispersion liquid Y was 82 nm.

(Preparation of Black Dispersion Liquid)

A dispersion (black dispersion liquid K) of resin coating pigment particles (pigments coated with a polymer dispersant) was prepared in the same manner as in the preparation of the cyan dispersion liquid except that carbon black (NIPEX 160-IQ manufactured by Evonic Degussa Japan Co., Ltd.) which is a black pigment was used instead of the Pigment Blue 15:3 (Phthalocyanine Blue A220, manufactured by Dainichiseika Color & Chemicals Mfg. Co., Ltd.) in the preparation of the cyan dispersion liquid. The average particle size of the obtained black dispersion liquid K was 130 nm.

[Preparation of Ink]

Respective components were mixed to obtain ink compositions shown in the following Table 1 using the obtained pigment dispersion liquids (cyan dispersion liquid C, magenta dispersion liquid M, yellow dispersion liquid Y, and black dispersion liquid K) and self-dispersing resin particles B-01 to prepare ink compositions (magenta ink composition M1, black ink composition K1, cyan ink composition C1, and yellow ink composition Y1).

The prepared ink compositions were respectively filtered through a PVDF 5-μm filter (Millex SV, diameter of 25 mm, manufactured by Milipore Corporation) using a disposable syringe made of plastic to obtain finished inks (magenta ink M1, black ink K1, cyan ink C1, and yellow ink Y1).

TABLE 1

|  | K1 | C1 | M1 | Y1 |
|---|---|---|---|---|
| Black pigment (Carbon Black) | 4% | — | — | — |
| Cyan pigment (Pigment Blue 15:3) | — | 4% | — | — |
| Magenta pigment (Pigment Red 122) | — | — | 4% | — |
| Yellow pigment (Pigment Yellow 74) | — | — | — | 4% |
| Pigment dispersant (Polymer dispersant P-1) | 2% | 2% | 2% | 2% |
| alkylene oxide adduct of glycerine [Specific glycerin-based compound $(1 + m + n \cong 9)$] | 25% | 25% | 25% | 25% |
| 2-pyrrolidone (manufactured by ISP) | 3% | 3% | 3% | 3% |
| Olefin E1010 (manufactured by Nissin Chemical Co., Ltd.) | 1% | 1% | 1% | 1% |
| Water | 65% | 65% | 65% | 65% |

[Preparation of Treatment Liquid of Sample 101]

Respective components are mixed to obtain the following composition and a treatment liquid of a sample 101 was prepared.

—Composition of Treatment liquid of Sample 101—

| | |
|---|---|
| Diethylene glycol monoethyl ether | 4% |
| Tripropylene glycol monomethyl ether | 4% |
| Organic acidic compound | 18% |
| [malonic acid/malic acid/propane tricarboxylic acid = 30/30/40 (mass ratio)] | |
| Inorganic acidic compound (phosphoric acid) | 4.3% |
| Water-soluble polymer 1 | 0.5% |
| Benzotriazole | 1% |
| Antifoaming agent [TSA-739 (15%) manufactured by Momentive Performance Materials Japan Limited Liability Co.; emulsion type silicone antifoaming agent] | 100 ppm as an amount of silicone oil |
| Ion-exchanged water | balance to make up 100% in total |

[Ink Set]

Each combination of the finished inks (black ink K1, cyan ink C1, magenta ink M1, and yellow ink Y1) was combined with the treatment liquid of the sample 101 to prepare an ink set of the sample 101.

[Preparation of Ink Sets of Samples 102 to 110 and 113 to 117]

Samples 102 to 110 and 113 to 117 (ink sets) were prepared in the same manner as in the preparation of the ink set of the sample 101 except that the composition in the preparation of the ink set of the sample 101 was changed as shown in Table 2 in the preparation of the ink set of the sample 101. In samples 111 and 112, only the ink composition of the composition shown in Table 2 was prepared without preparing the treatment liquid.

Specifically, the respective compositions of the ink compositions in the samples 102 to 117 are compositions in which the types and the amounts of "alkylene oxide adduct of glycerine" and "2-pyrrolidone" shown in Table 1 were changed to those of the "specific glycerin-based compound" and the "pyrrolidone derivative or other solvents" shown in Table 2. In addition, the section "water, 65%" shown in Table 1 was set as a balance to make up 100% in total in accordance with the change amount of the "specific glycerin-based compound" and the "pyrrolidone derivative or other solvents".

The compositions of the treatment liquids in the samples 102 to 110 and 113 to 117 are compositions in which the type and the amount of the organic acidic compound in the composition of the treatment liquid of the sample 101 were changed to those shown in Table 2.

In Table 2, the numerical value in the column of "total" in the column of "organic acidic compound" represents the content of the total organic acidic compound contained in the treatment liquid with respect to the total amount of the treatment liquid, and the numerical value in the column of "specific" represents the content of the specific organic acidic compound (organic acidic compound represented by the general formula (I)) contained in the treatment liquid with respect to the total amount of the treatment liquid. In addition, the "specific glycerin-based compound" in Table 2 represents a compound represented by the general formula (II). Accordingly, "AO" in the column of "type" in the column of "specific glycerin-based compound" represents "AO" in the general formula (II) and "l+m+n" means the total number of l, m, and n in the general formula (II).

(Image Formation)

The respective samples (ink sets) prepared as described above were charged in sequence into cartridges using a Dimatix Material Printer DMP-2831 manufactured by Fujifilm Dimatix, Inc., and images were formed at a conveyance speed of 100 m/min. The formed images were subjected to the following evaluations.

Image formation was performed by remodeling the printer so as to supply a liquid to cartridges from the outside using cartridges (DMC-11610) for 10 pl (picoliters) ejection and to be able to draw images at a conveyance speed of 100 m/min. When drawing images, IJ-PDW70 manufactured by Mitsubishi Paper Mills, Ltd. and Npi Form NEXT-IJ70 manufactured by Nippon Paper Industries Co., Ltd. were used as paper pieces exclusively for inkjet printing.

In the image formation, ejection of an ink was set to start within 10 seconds after the treatment liquid applying step.

—Treatment Liquid Applying Step—

A treatment liquid was applied on a surface of a recording medium such that the coating amount became 1.0 g/m², using a coating bar immediately before applying an ink on the recording medium.

—Ink Applying Step—

Four colored single-pass images were formed on the recording medium on which the treatment liquid was applied. Specifically, each color ink was applied (ejected) on the treatment liquid of the recording medium on which the treatment liquid is applied to form images.

[Evaluation]

(1) Scratch Resistance

Figures 1A, 1B:
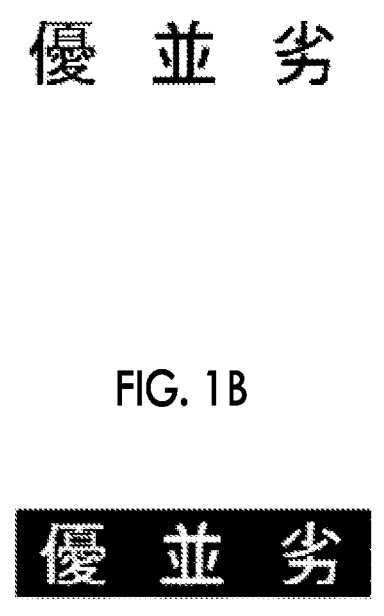

Images which were formed from ordinary characters (Japanese Kanji shown in FIG. 1A) of "優 (the character represented by UTF-8:E584AA), 並 (the character represented by UTF-8:E4B8A6), and 劣 (the character represented by UTF-8:E58AA3)," and outlined characters (Japanese Kanji shown in FIG. 1B) of "優 (the character represented by UTF-8:E584AA), 並 (the character represented by UTF-8:E4B8A6), and 劣 (the character represented by UTF-8:E58AA3)," were drawn on respective paper sheets of IJ-PDW70 (manufactured by Mitsubishi Paper Mills, Ltd.) and Npi Form NEXT-IJ70 (manufactured by Nippon Paper Industries Co., Ltd.) as paper sheets exclusively for inkjet printing, with 6 g/m² of an amount of ink applied. One hour after the image drawing, the image-drawn surfaces were rubbed together 20 times while being pressed at a pressure of 0.15 kg/cm². This operation was performed 10 times for each of the paper sheets, and a sensory evaluation was performed by five evaluators according to the following evaluation criteria. The average point of the scores of the five evaluators was obtained for each of the paper sheets, and was used as an evaluation index. The evaluation results are shown in Table 2.

—Evaluation Criteria—

5: Blurring or bleeding of images did not occur in any of the ordinary characters and outlined characters, and a satisfactory image quality was obtained.

4: Slight blurring or bleeding of images occurred in both the ordinary characters and outlined characters, but the image quality was at an acceptable level.

3: Blurring or bleeding of images occasionally occurred in both the ordinary characters and outlined characters, but the characters could be discriminated, and the image quality was at a practically acceptable level.

2: Blurring or bleeding of images occurred in both the ordinary characters and outlined characters, and the image quality was at a level causing practical impediment, for example, discrimination of outlined characters being impossible particularly due to the influence of bleeding.

1: Blurring or bleeding of images occurred in both the ordinary characters and outlined characters, and the image quality was at a level causing practical impediment, for example, discrimination of both the ordinary characters and the outlined characters being impossible due to the influence of bleeding.

(2) Resolution

Images which were formed from ordinary characters (Japanese Kanji shown in FIG. 2A) of "優 (the character represented by UTF-8:E584AA)" and outlined characters (Japanese Kanji shown in FIG. 2B) of "優 (the character represented by UTF-8:E584AA)" as shown in FIGS. 2A and 2B were continuously drawn on respective paper sheets of IJ-PDW70 (manufactured by Mitsubishi Paper Mills, Ltd.) and Npi Form NEXT-IJ170 (manufactured by Nippon Paper Industries Co., Ltd.) in length of 50 m, with 6 g/m² of an amount of ink applied, using Mincho font of 6 pt, 10 pt, and 14 pt. The images were visually observed and the evaluation was performed by five evaluators in accordance with the following evaluation criteria. The average point of the scores of the five evaluators was obtained for each of the paper sheets, and was used as an evaluation index. The evaluation results are shown in Table 2.

—Evaluation Criteria—

5: Blurring or bleeding of images did not occur in any of the ordinary characters and outlined characters, and a satisfactory image quality with high resolution of characters was obtained.

4: Slight blurring or bleeding of images occurred in both the ordinary characters and outlined characters, but the image quality was at an acceptable level.

3: Blurring or bleeding of images occasionally occurred in both the ordinary characters and outlined characters and images are overlapped with lines or dots, but the characters could be discriminated, and the image quality was at a practically acceptable level.

2: Blurring or bleeding of images occurred in both the ordinary characters and outlined characters, and the image quality was at a level causing practical impediment, for example, discrimination of outlined characters being impossible particularly due to the influence in which the images are overlapped with lines or dots.

1: Blurring or bleeding of images occurred in both the ordinary characters and outlined characters, and the image quality was at a level causing practical impediment, for example, low resolution of both the ordinary characters and the outlined characters and discrimination of both the ordinary characters and the outlined characters being impossible.

TABLE 2

| | Treatment liquid | | | | | | | | Ink composition | | | | Evaluation result | |
| | Organic acidic compound | | | | Water-soluble polymer | Antifoaming agent | | Specific glycerin-based compound | | Pyrrolidone derivative or other solvents | | | | |
| | Type | Mass ratio | Addition amount (%) Total | Specific | No | Type | Type | Classification | Type | Addition amount (%) | Type | Addition amount (%) | Scratch resistance | Resolution |
| Sample 101 (present invention) | Malonic acid/ malic acid/ propane tricarboxylic acid | 30/30/40 | 18 | 7.2 | 1 | MMA/EA/AMPS | TSA-739 | Silicone | AO = propyl-eneoxyl + m + n ≅ 9 | 25 | 2-pyrrolidone | 3 | 3 | 5 |
| Sample 102 (present invention) | Malonic acid/ malic acid/ propane tricarboxylic acid | 30/30/40 | 18 | 7.2 | 1 | MMA/EA/AMPS | TSA-739 | Silicone | AO = propyl-eneoxyl + m + n ≅ 9 | 25 | 2-pyrrolidone | 8 | 4 | 5 |
| Sample 103 (present invention) | Malonic acid/ malic acid/ propane tricarboxylic acid | 30/30/40 | 18 | 7.2 | 1 | MMA/EA/AMPS | TSA-739 | Silicone | AO = propyl-eneoxyl + m + n ≅ 9 | 25 | 2-pyrrolidone | 12 | 4 | 5 |

TABLE 2-continued

| | Treatment liquid | | | | | | | | Ink composition | | | | Evaluation result | |
|---|---|---|---|---|---|---|---|---|---|---|---|---|---|---|
| | Organic acidic compound | | | | Water-soluble polymer | | Antifoaming agent | | Specific glycerin-based compound | | Pyrrolidone derivative or other solvents | | | |
| | | | Addition amount (%) | | | | | | | Addition | | Addition | Scratch | |
| | Type | Mass ratio | Total | Specific | No | Type | Type | Classification | Type | amount (%) | Type | amount (%) | resistance | Resolution |
| Sample 104 (present invention) | Malonic acid/ malic acid/ propane tri-carboxylic acid | 30/ 30/ 40 | 18 | 7.2 | 1 | MMA/ EA/ AMPS | TSA-739 | Silicone | AO = propyleneoxyl + m + n ≅ 9 | 25 | 2-pyrrolidone | 17 | 5 | 5 |
| Sample 105 (present invention) | Malonic acid/ malic acid/ propane tri-carboxylic acid | 30/ 30/ 40 | 18 | 7.2 | 1 | MMA/ EA/ AMPS | TSA-739 | Silicone | AO = propyleneoxyl + m + n ≅ 9 | 25 | 2-pyrrolidone | 20 | 5 | 5 |
| Sample 106 (present invention) | Malonic acid/ malic acid/ propane tri-carboxylic acid | 45/ 45/ 10 | 5 | 0.5 | 1 | MMA/ EA/ AMPS | TSA-739 | Silicone | AO = propyleneoxyl + m + n ≅ 9 | 25 | 2-pyrrolidone | 12 | 4 | 5 |
| Sample 107 (present invention) | Malonic acid/ malic acid/ propane tri-carboxylic acid | 25/ 25/ 50 | 40 | 2.0 | 1 | MMA/ EA/ AMPS | TSA-739 | Silicone | AO = propyleneoxyl + m + n ≅ 9 | 25 | 2-pyrrolidone | 12 | 4 | 5 |
| Sample 108 (present invention) | Malonic acid/ malic acid/ propane tri-carboxylic acid | 30/ 30/ 40 | 18 | 7.2 | 1 | MMA/ EA/ AMPS | TSA-739 | Silicone | AO = propyleneoxyl + m + n ≅ 4 | 25 | 2-pyrrolidone | 20 | 5 | 5 |
| Sample 109 (present invention) | Malonic acid/ malic acid/ propane tri-carboxylic acid | 30/ 30/ 40 | 18 | 7.2 | 1 | MMA/ EA/ AMPS | TSA-739 | Silicone | AO = propyleneoxyl + m + n ≅ 7 | 25 | 2-pyrrolidone | 20 | 5 | 5 |
| Sample 110 (present invention) | Malonic acid/ malic acid/ propane tri-carboxylic acid | 30/ 30/ 40 | 18 | 7.2 | 1 | MMA/ EA/ AMPS | TSA-739 | Silicone | AO = propyleneoxyl + m + n ≅ 14 | 25 | 2-pyrrolidone | 20 | 5 | 5 |
| Sample 111 (comparative example) | None | — | — | — | | None | — | None | — | AO = propyleneoxyl + m + n ≅ 9 | 31 | None | — | 1 | 1 |
| Sample 112 (comparative example) | None | — | — | — | | None | — | None | — | AO = propyleneoxyl + m + n ≅ 9 | 25 | 2-pyrrolidone | 3 | 3 | 1 |
| Sample 113 (comparative example) | Malic acid | 100 | 18 | 0 | 1 | MMA/ EA/ AMPS | TSA-739 | Silicone | AO = propyleneoxyl + m + n ≅ 9 | 31 | None | — | 1 | 2 |

TABLE 2-continued

| | Treatment liquid | | | | | | | | Ink composition | | | | Evaluation result | |
|---|---|---|---|---|---|---|---|---|---|---|---|---|---|---|
| | Organic acidic compound | | | | Water- | Antifoaming | | | Specific glycerin-based compound | | Pyrrolidone derivative or other solvents | | | |
| | | | Addition amount (%) | | soluble | agent | | | | Addition | | Addition | Scratch | |
| | Type | Mass ratio | Total | Specific | No | polymer Type | Type | Classification | Type | amount (%) | Type | amount (%) | resistance | Resolution |
| Sample 114 (comparative example) | Malonic acid | 100 | 18 | 0 | 1 | MMA/ EA/ AMPS | TSA-739 | Silicone | AO = propyleneoxyl + m + n ≅ 9 | 31 | None | — | 1 | 2 |
| Sample 115 (comparative example) | Malonic acid | 100 | 18 | 0 | 1 | MMA/ EA/ AMPS | TSA-739 | Silicone | AO = propyleneoxyl + m + n ≅ 9 | 25 | Glycerin | 5 | 1 | 2 |
| Sample 116 (comparative example) | Malonic acid | 100 | 18 | 0 | 1 | MMA/ EA/ AMPS | TSA-739 | Silicone | AO = propyleneoxyl + m + n ≅ 9 | 25 | Propylene glycol | 5 | 1 | 2 |
| Sample 117 (comparative example) | Malonic acid | 100 | 18 | 0 | 1 | MMA/ EA/ AMPS | TSA-739 | Silicone | AO = propyleneoxyl + m + n ≅ 9 | 25 | 2-pyrrolidone | 3 | 3 | 2 |

Example 2

An ink set of a sample 201 was prepared in the same manner as the preparation of the ink set of the sample 101 except that a treatment liquid was prepared without using the silicone oil in the treatment liquid of the sample 101 in the preparation of the ink set of the sample 101 in Example 1.

The scratch resistance and the resolution were evaluated in the same manner as in Example 1, and as a result, the same improvement effect on the scratch resistance and the resolution as that in the sample 101 of Example 1 was also recognized in the sample 201. However, in the sample 201, application unevenness which is considered to be caused by bubbles of the treatment liquid was generated, and therefore, the sample 101 was more excellent from the viewpoint of stable resolution.

Accordingly, it was possible to prevent the application unevenness from being generated by incorporating silicone oil into the treatment liquid, and therefore, it was found that it was possible to obtain images with stable resolution by forming the images using the treatment liquid containing silicone oil.

Example 3

Ink sets of samples 301 to 303 were prepared in the same manner as in the preparation of the ink set of the sample 101 except that the organic acidic compound in the treatment liquid of the sample 101 in the preparation of the ink set of the sample 101 in Example 1 was changed to the organic acidic compound as shown in Table 3.

TABLE 3

| | Organic acidic compound | | | |
|---|---|---|---|---|
| Sample | Type and mass ratio | Total | Specific | Notes |
| Sample 101 | Malonic acid/malic acid/propane tricarboxylic acid = 30/30/40 | 18 | 7.2 | Present invention |
| Sample 301 | Malonic acid/propane tricarboxylic acid = 50/50 | 18 | 9 | Present invention |
| Sample 302 | propane tricarboxylic acid | 18 | 18 | Present invention |
| Sample 303 | glutaric acid/propane tricarboxylic acid = 50/50 | 18 | 9 | Present invention |

The scratch resistance and the resolution with respect to the samples 301 to 303 were evaluated in the same manner as in the sample 101 of Example 1, and as a result, the same improvement effect on the scratch resistance and the resolution as that in the sample 101 of Example 1 was recognized also in the samples 301 to 303. However, when the sample 101 and the samples 301 to 303 were compared, the scratch resistance and the resolution in the sample 101 were slightly superior compared to those in the samples 301 to 303.

Example 4

Ink sets of samples 401 to 405 were prepared in the same manner as in the preparation of the ink set of the sample 101 except that 2-pyrrolidone in the composition of the sample 101 in the preparation of the ink set of the sample 101 in Example 1 was changed to the pyrrolidone derivative as shown in Table 4.

TABLE 4

| Sample | Pyrrolidone or derivative of pyrrolidone | Notes |
|---|---|---|
| Sample 101 | 2-pyrrolidone | Present invention |
| Sample 401 | N-methyl-2-pyrrolidone | Present invention |
| Sample 402 | N-ethyl-2-pyrrolidone | Present invention |
| Sample 403 | N-butyl-2-pyrrolidone | Present invention |
| Sample 404 | N-vinyl-2-pyrrolidone | Present invention |
| Sample 405 | 5-methyl-2-pyrrolidone | Present invention |

The scratch resistance and the resolution with respect to the samples 401 to 405 were evaluated in the same manner as in the sample 101 of Example 1, and as a result, the same improvement effect on the scratch resistance and the resolution as that in the sample 101 of Example 1 was recognized also in the samples 401 to 405. However, when the sample 101 and the samples 401 to 405 were compared, the scratch resistance and the resolution in the sample 101 were slightly superior compared to those in the samples 401 to 405.

Example 5

Ink sets of samples 501 to 508 were prepared in the same manner as in the preparation of the ink set of the sample 101 except that the water-soluble polymer 1 in the composition of the sample 101 in the preparation of the ink set of the sample 101 in Example 1 was changed to the water-soluble polymers 2 to 9 as shown in Table 5.

[Synthesis of Water-soluble polymers 2 to 9]

Water-soluble polymers 2 to 9 of the following chemical formulas shown in Table 5 were synthesized in the same manner as in the synthesis of the water-soluble polymer 1 except that the type of the monomer and the mixing ratio in the synthesis of the water-soluble polymer 1 were changed.

In the chemical formulas of water-soluble polymers 2 to 9, Me is a methyl group, Et is an ethyl group, nBu is a normal butyl group, and tBu is a tertiary butyl group.

In Table 5, the water-soluble polymer 2 is denoted as "MMA/AMPS", the water-soluble polymer 3 is denoted as "MMA/SPA (K)", the water-soluble polymer 4 is denoted as "MMA/BMA/AMPS", the water-soluble polymer 5 is denoted as "MMA/TBMA/AMPS", the water-soluble polymer 6 is denoted as "MMA/IBOMA/AMPS", the water-soluble polymer 7 is denoted as "MMA/CHMA/AMPS", the water-soluble polymer 8 is denoted as "MMA/BzMA/AMPS", and the water-soluble polymer 9 is denoted as "MMA/PEMA/AMPS", focusing on the monomer component of the water-soluble polymer.

SPA (K) represents sulfopropyl acrylate potassium salt, TBMA represents tert-butyl methacrylate, IBOMA represents isobornyl methacrylate, CHMA represents cyclohexyl methacrylate, BzMA represents benzyl methacrylate, and PEMA represents a 2-phenoxyethyl methacrylate.

[Chem. 18]

Water-soluble polymer 2

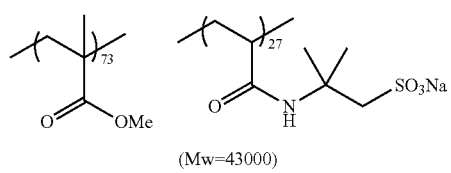

(Mw=43000)

Water-soluble polymer 3

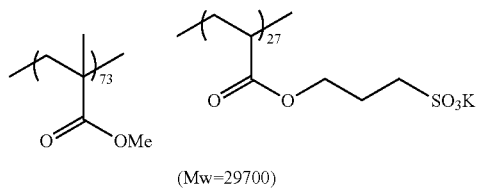

(Mw=29700)

Water-soluble polymer 4

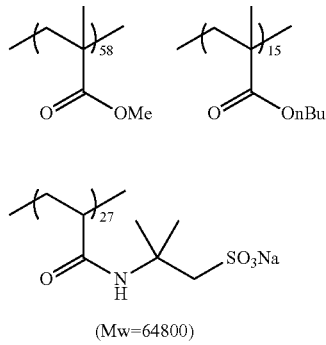

(Mw=64800)

Water-soluble polymer 5

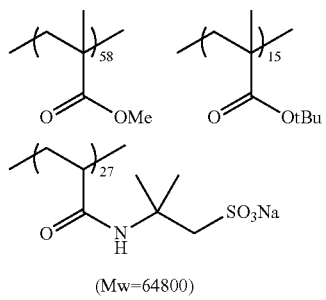

(Mw=64800)

Water-soluble polymer 6

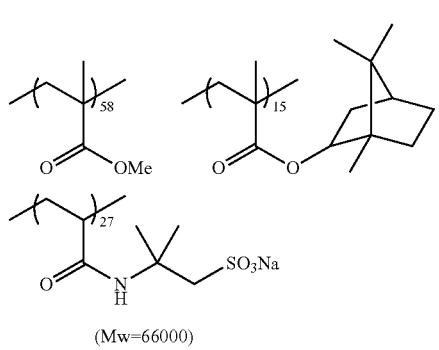

(Mw=66000)

Water-soluble polymer 7

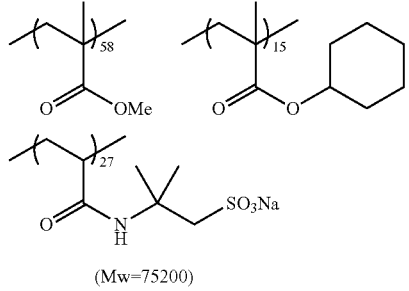

(Mw=75200)

-continued

Water-soluble polymer 8

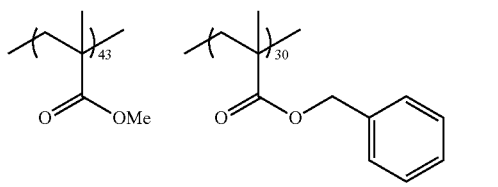

(Mw=42300)

Water-soluble polymer 9

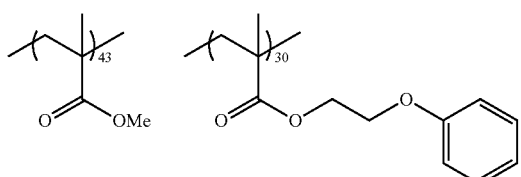

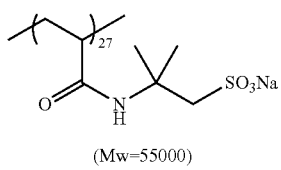

(Mw=55000)

TABLE 5

| Sample | Water-soluble polymer | | Notes |
|---|---|---|---|
| | No | Components | |
| Sample 101 | 1 | MMA/EA/AMPS | Present invention |
| Sample 501 | 2 | MMA/AMPS | Present invention |
| Sample 502 | 3 | MMA/SPA(K) | Present invention |
| Sample 503 | 4 | MMA/BMA/AMPS | Present invention |
| Sample 504 | 5 | MMA/TBMA/AMPS | Present invention |
| Sample 505 | 6 | MMA/IBOMA/AMPS | Present invention |
| Sample 506 | 7 | MMA/CHMA/AMPS | Present invention |
| Sample 507 | 8 | MMA/BzMA/AMPS | Present invention |
| Sample 508 | 9 | MMA/PEMA/AMPS | Present invention |

The scratch resistance and the resolution with respect to the samples 501 to 508 in Table 5 were evaluated in the same manner as in the sample 101 of Example 1, and as a result, the same improvement effect on the scratch resistance and the resolution as that in the sample 101 of Example 1 was recognized also in the samples 501 to 508. When the sample 101 and the samples 501 to 508 were compared, the scratch resistance and the resolution in the sample 101 and the samples 501 to 508 were almost the same as each other.

What is claimed is:
1. An image forming method comprising:
applying a treatment liquid, which contains an organic acidic compound represented by the following general formula (I), a water-soluble polymer compound, and water, on a recording medium; and
applying an ink composition, which contains a pigment, a compound having a lactam structure of 5-membered ring, a compound represented by the following general formula (II), and water, on a treatment liquid-applied surface of the recording medium,

[Chem. 1]

$$C_nH_{2n+2-m}(COOH)_m \qquad \text{General Formula (I)}$$

wherein in the general formula (I), n represents an integer of 2 or greater and m represents an integer of 3 or greater,

[Chem. 2]

General Formula (II)

$$\begin{array}{l} H_2C-(AO)_lOH \\ HC-(AO)_mOH \\ H_2C-(AO)_nOH \end{array}$$

wherein in the general formula (II), l, m, and n each independently represent an integer of 1 or greater, the relation l+m+n=3 to 15 is satisfied, and AO represents at least one of ethyleneoxy and propyleneoxy, and
wherein the water-soluble polymer compound contains a hydrophilic structural unit having an anionic group.

2. The image forming method according to claim 1, wherein the treatment liquid further contains silicone oil.

3. The image forming method according to claim 1, wherein in applying the ink composition, the recording medium is conveyed at a conveyance speed of 50 m/min or higher.

4. The image forming method according to claim 1, wherein the compound having the lactam structure of 5-membered ring is at least one of 2-pyrrolidone and N-methyl-2-pyrrolidone.

5. The image forming method according to claim 1, wherein the content of the compound having the lactam structure of 5-membered ring in the ink composition is 3.0 mass % to 20.0 mass % relative to the total mass of the ink composition.

6. The image forming method according to claim 1, wherein the content of the organic acidic compound in the treatment liquid is 0.5 mass % to 20.0 mass % relative to the total mass of the treatment liquid.

7. The image forming method according to claim 1, wherein AO in the general formula (II) is propyleneoxy.

8. The image forming method according to claim 1, wherein the water-soluble polymer compound contains a structural unit represented by the following general formula (A) and a structural unit represented by the following general formula (B),

[Chem. 3]

General Formula (A)

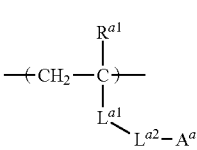

wherein in the general formula (A), $R^{a1}$ represents a hydrogen atom or a methyl group, $L^{a1}$ represents a single bond, —COO—, or —CON($R^{a3}$)—, and $R^{a3}$ represents a hydrogen atom or a monovalent group, which has 1 to 30 carbon atoms and may include at least one of an ether bond, a thioether bond, and an ester bond, and $L^{a2}$ represents a single bond or a divalent linking group, which has 1 to 30 carbon atoms and may include at least one of an ether bond, a thioether bond, and an ester bond, $A^a$ represents an ionic group,

[Chem. 4]

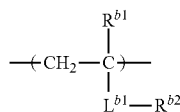

General Formula (B)

wherein in the general formula (B), $R^{b1}$ represents a hydrogen atom or a methyl group, $L^{b1}$ represents a single bond, —COO—, or —CON($R^{b3}$)—, and $R^{b3}$ represents a hydrogen atom or a monovalent group, which has 1 to 30 carbon atoms and may include at least one of an ether bond, a thioether bond, and an ester bond, and $R^{b2}$ represents a hydrogen atom or a monovalent group, which has 1 to 30 carbon atoms and may include at least one of an ether bond, a thioether bond, and an ester bond, where when $R^{b2}$ is a hydrogen atom, $L^{b1}$ is a single bond.

9. The image forming method according to claim 8, wherein $R^{b2}$ is a linear aliphatic hydrocarbon group having 1 to 12 carbon atoms, an aliphatic hydrocarbon group having a branched structure and 3 to 12 carbon atoms, an aliphatic hydrocarbon group having a ring structure and 3 to 12 carbon atoms, an aralkyl group having 7 to 12 carbon atoms, or an aryloxyalkyl group having 7 to 12 carbon atoms.

10. The image forming method according to claim 8, wherein $R^{a1}$ is a hydrogen atom, $L^{a1}$ is —COO— or —CONH—, $L^{a2}$ is an alkylene group having 1 to 12 carbon atoms, and $A^a$ is a sulfonic acid group or a salt thereof, and wherein $R^{b1}$ is a hydrogen atom or a methyl group, $L^{b1}$ is —COO—, and $R^{b2}$ is a linear aliphatic hydrocarbon group having 1 to 12 carbon atoms, an aliphatic hydrocarbon group having a branched structure and 3 to 12 carbon atoms, an aliphatic hydrocarbon group having a ring structure and 3 to 12 carbon atoms, an aralkyl group having 7 to 12 carbon atoms, or an aryloxyalkyl group having 7 to 12 carbon atoms.

11. The image forming method according to claim 4, wherein the water-soluble polymer compound contains a structural unit represented by the following general formula (A) and a structural unit represented by the following general formula (B),

[Chem. 5]

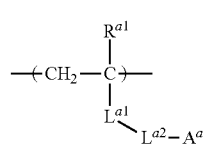

General Formula (A)

wherein in the general formula (A), $R^{a1}$ represents a hydrogen atom or a methyl group, $L^{a1}$ represents a single bond, —COO—, or —CON($R^{a3}$)—, and $R^{a3}$ represents a hydrogen atom or a monovalent group, which has 1 to 30 carbon atoms and may include at least one of an ether bond, a thioether bond, and an ester bond, and $L^{a2}$ represents a single bond or a divalent linking group, which has 1 to 30 carbon atoms and may include at least one of an ether bond, a thioether bond, and an ester bond, where in the general formula (A), $A^a$ represents an ionic group,

[Chem. 6]

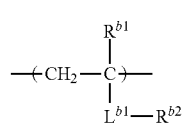

General Formula (B)

wherein in the general formula (B), $R^{b1}$ represents a hydrogen atom or a methyl group, $L^{b1}$, represents a single bond, —COO—, or —CON($R^{b3}$)—, and $R^{b3}$ represents a hydrogen atom or a monovalent group, which has 1 to 30 carbon atoms and may include at least one of an ether bond, a thioether bond, and an ester bond, and $R^{b2}$ represents a hydrogen atom or a monovalent group, which has 1 to 30 carbon atoms and may include at least one of an ether bond, a thioether bond, and an ester bond, where when $R^{b2}$ is a hydrogen atom, $L^{b1}$ is a single bond.

* * * * *